(12) United States Patent
Nishiwaki et al.

(10) Patent No.: US 6,727,334 B2
(45) Date of Patent: Apr. 27, 2004

(54) RESIN COMPOSITION AND CURED PRODUCT

(75) Inventors: Isao Nishiwaki, Toride (JP); Yoshikazu Yamaguchi, Ibaraki (JP); Yuichi Eriyama, Inarimae (JP); Takashi Ukachi, Kamiya (JP)

(73) Assignees: DSM N.V., Heerlen (NL); JSR Corporation, Tokyo (JP); Japan Fine Coatings Co., Ltd., Tokyo (JP)

( * ) Notice: Subject to any disclaimer, the term of this patent is extended or adjusted under 35 U.S.C. 154(b) by 152 days.

(21) Appl. No.: 09/929,290

(22) Filed: Aug. 15, 2001

(65) Prior Publication Data

US 2002/0058737 A1 May 16, 2002

Related U.S. Application Data

(63) Continuation of application No. PCT/NL00/00089, filed on Feb. 11, 2000.

(30) Foreign Application Priority Data

| Feb. 15, 1999 | (JP) | 11-035652 |
| Mar. 3, 1999 | (JP) | 11-056250 |
| Mar. 8, 1999 | (JP) | 11-060353 |
| Mar. 25, 1999 | (JP) | 11-082642 |
| Mar. 30, 1999 | (JP) | 11-087920 |

(51) Int. Cl.$^7$ .................. C08F 230/08; C08F 130/08; C08F 5/00

(52) U.S. Cl. .................. 526/240; 526/241; 526/279; 524/202; 524/203; 524/211; 524/432; 524/535

(58) Field of Search .................. 525/245; 524/203, 524/202, 211, 535, 432; 526/240, 241, 279

(56) References Cited

U.S. PATENT DOCUMENTS

| 2002/0082323 A1 | 6/2002 | Chawla et al. |
| 2003/0096928 A1 | 5/2003 | Chawla et al. |

FOREIGN PATENT DOCUMENTS

| EP | 0075957 | 4/1983 |
| EP | 0867469 | 9/1998 |
| EP | 0 867 469 A2 * | 9/1998 |
| WO | 9712942 | 4/1997 |
| WO | 9931190 | 6/1999 |

* cited by examiner

*Primary Examiner*—Robert Harlan
(74) *Attorney, Agent, or Firm*—Pillsbury Winthrop LLP

(57) ABSTRACT

The invention relates to a resin composition exhibiting excellent coatability and capable of forming coatings with high hardness, superior scratch resistance, low curling properties, superb adhesion, excellent transparency, and superior coating surface appearance without a wavy striation, streaks, unevenness of coatings, cissing, and the like, as well as cured products made from the resin composition.

24 Claims, 1 Drawing Sheet

RESIN COMPOSITION AND CURED PRODUCT

CROSS-REFERENCE TO RELATED APPLICATIONS

This Application is a continuation of International Application PCT/NL00/00089, filed Feb. 11, 2000, which designated the U.S. and was published in the English language. The entire contents of this PCT application are hereby incorporated by reference.

FIELD OF THE INVENTION

The present invention relates to crosslinkable particles, a resin composition comprising the crosslinkable particles and a cured product made from the resin composition. More particularly, the present invention relates to crosslinkable particles exhibiting superior dispersion stability and storage stability without producing any depositions or precipitates, and without increasing the viscosity or producing gels during storage; a resin composition comprising crosslinkable particles, which is capable of forming coatings with high hardness, superior scratch resistance, low curling properties, superb adhesion, and excellent transparency, and fine appearance on the surface of various substrates for example plastics (polycarbonate, polymethylene acrylate, polystyrene, polyester, polyolefin, epoxy, melamine, triacetyl cellulose, ABS resin, AS resin, norbornene resin, etc.), metals, woods, papers, glass and slates. These substrates may be either in the shape of a film or a formed three-dimensional object. The resin composition and the cured product are suitable for use as, for example, a protective coating material to prevent stains or scratches on plastic optical parts, touch panels, film-type liquid crystal elements, plastic containers, or flooring materials, wall materials, and artificial marbles which are used for architectural interior finish; an adhesive and a sealing material forvarious substrates; and a vehicle for printing ink.

BACKGROUND

In recent years, a resin composition exhibiting excellent curability, superior storage stability, coatability and capability of forming coatings with high hardness, superior scratch resistance, low curling properties, superb adhesion, excellent transparency, and superior coating appearance has been desired as a protective coating material to prevent stains or scratches on the surface of various substrates, an adhesive and a sealing material for various substrates, or a vehicle for printing ink. Various materials in which colloidal silica is incorporated have been proposed with an objective to improve the scratch resistance among these required characteristics. For example, U.S. Pat. Nos. 3,451,838 and 2,404,357 disclose compositions comprising a hydrolyzate of alkoxysilane and colloidal silica as major components to be used as a heat-curable coating material. Japanese Patent Publication No. 21815/1987 discloses a composition for a photocurable coating material comprising an acrylate and particles of colloidal silica of which the surface is modified by methacryloxysilane. A feature of these coating materials is to improve performance of the coating materials by treating the surface of silica particles with a specific organic silane or under specific conditions. However, these coating materials do not satisfy all the requirements such as curability, storage stability and coatability as a resin, and high hardness, superior scratch resistance, low curling properties, superb adhesion, excellent transparency, and coating appearance when made into coatings.

Furthermore, Japanese Patent Application Laid-open No. 100111/1997 discloses reactive silica particles produced by bonding silica particles and an organic compound having a polymerizable unsaturated group through a silyloxy group. However, these reactive silica particles produce deposits or precipitates when used in the form of a sol in which the particles are dispersed in a solvent, and thus do not necessarily exhibit satisfactory dispersion stability.

Although the resin composition comprising these crosslinkable particles is excellent in curability and produces cured coatings with superior hardness, scratch resistance, low curling properties, and adhesion properties, and the like, the following properties are not necessarily satisfied.

Specifically, the resin composition does not always exhibit sufficient storage stability in that the composition may produce precipitates and its viscosity may increase with time. Particularly, the tendency is conspicuous with the increase of the particle concentration. In addition, the appearance of coatings may be poor that is, the coated surface may not be smooth, may have striations, be repellent and whitened, or have an orange-peel appearance. Moreover, the coating films may be have poor transparency and produce haze.

Particularly, because of an increase of the productivity in the manufacture of coated products in recent years, there has been improvement in production facilities such as an increase of the product line speed and an increase of a dryer air speed and drying temperature. Such improvement in production facilities, however, causes an impaired appearance of coatings such as production of a wavy striation, streaks, unevenness of coatings, and cissing.

The present invention has been completed in view of the above-described problems and has an object of providing a resin composition exhibiting excellent curability, coatability and capability of forming coatings with high hardness, superior scratch resistance, low curling properties, superb adhesion, excellent transparency, and superior coating surface appearance without a wavy striation, streaks, unevenness of coatings, cissing, and the like, as well as cured products or composite materials produced by applying and curing the resin composition on the surface of a substrate. A further objective is providing crosslinkable particles exhibiting superior dispersion stability and storage stability without producing any depositions or precipitates, and without increasing the viscosity or generating gels during storage.

SUMMARY OF THE INVENTION

As a result of extensive studies, the present inventors have found that the products satisfying all the above characteristics can be obtained by a resin composition comprising ($A_1$) crosslinkable particles (A) prepared by bonding oxide particles ($A_1$) of a specific element and a specific organic compound ($A_2$) having a specific group, (B) a compound which possesses 4 or more polymerizable unsaturated groups in the molecule, and (C) a compound which possesses one (1) to three (3) polymerizable unsaturated groups in the molecule.

DETAILED DESCRIPTION OF THE INVENTION

Figure 1:
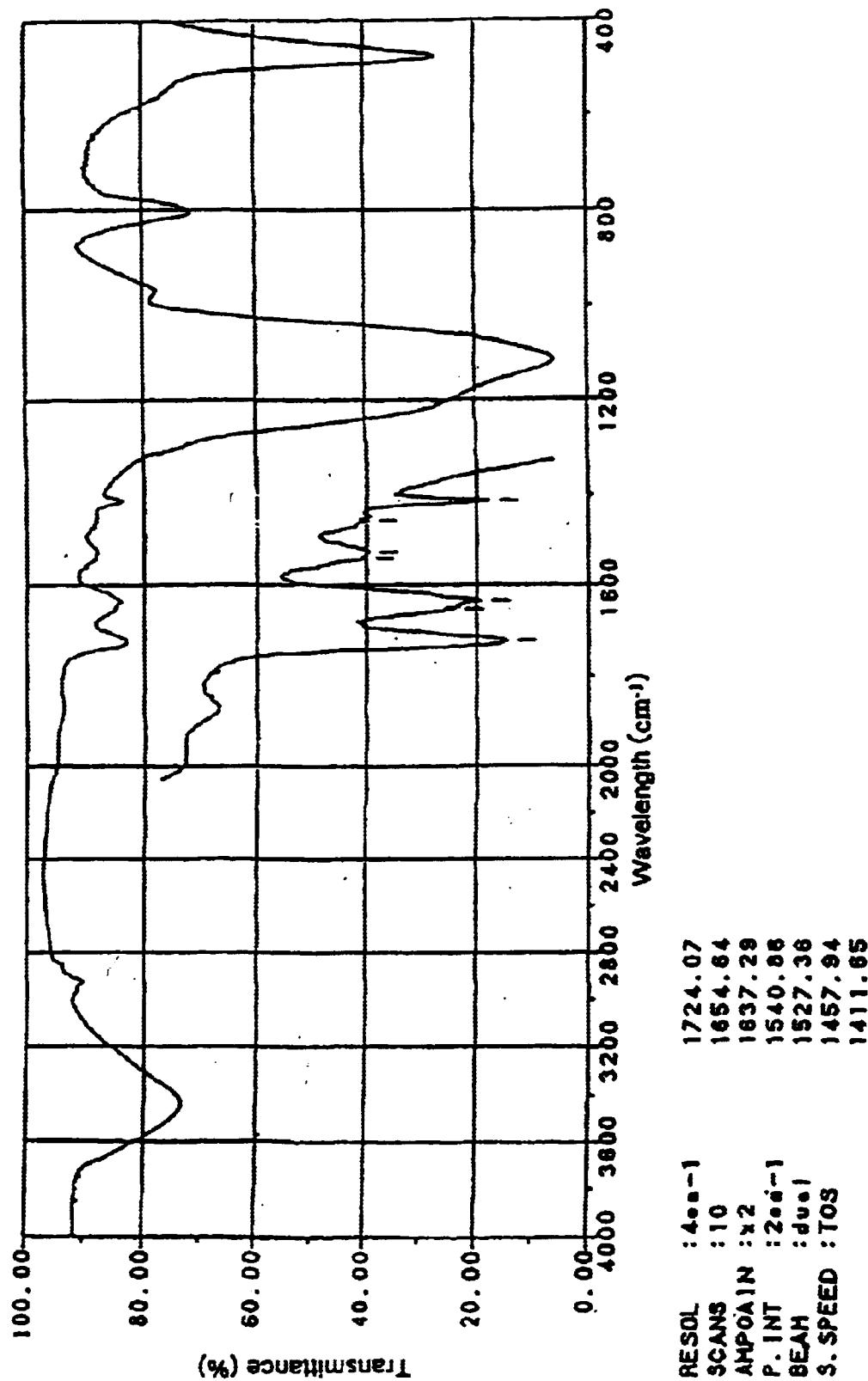
FIG. 1 represents an infrared spectrum of crosslinkable particles (A).

The resin composition and the cured products thereof of the present invention will now be described in more detail.

I. Resin Composition

A crosslinkable resin composition of the present invention comprises:

(A) particles (A) prepared by bonding at least one oxide ($A_1$) of an element selected from the group consisting of silicon, aluminum, zirconium, titanium, zinc, germanium, indium, tin, antimony, and cerium, and a specific organic compound ($A_2$) which includes a polymerizable unsaturated group and a group shown by the following formula (1):

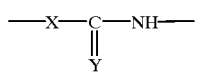
(1)

wherein X represents NH, O (oxygen atom), or S (sulfur atom), and Y represents O or S, (B) a compound which possesses four (4) or more polymerizable unsaturated groups in the molecule, and (C) a compound which possesses one (1) to three (3) polymerizable unsaturated groups in the molecule and, as required, (D) a polymerization initiator for example a radioactive polymerization initiator comprising an aryl ketone having a 1-hydroxycyclohexyl group or an aryl ketone having an N-morpholino group, or both.

The components and the amount used in the resin composition of the present invention will now be described.

1. Crosslinkable Particles (A)

The crosslinkable particles (A) used in the present invention are the particles produced by bonding particles ($A_1$) of at least one oxide of an element selected from the group consisting of silicon, aluminum, zirconium, titanium, zinc, germanium, indium, tin, antimony, and cerium, and a specific organic compound ($A_2$) which includes a polymerizable unsaturated group and a group shown by the above formula (1). Preferably, the crosslinkable particles (A) also contain a compound which does not include a polymerizable unsaturated group, but includes a silanol group or a group which forms a silanol group by hydrolysis (hereinafter called "compound ($A_3$)").

1.1. Oxide Particles ($A_1$)

For obtaining uncolored cured coatings from the resin composition, the oxide particles ($A_1$) used in the present invention should be particles of at least one oxide of an element selected from the group consisting of silicon, aluminum, zirconium, titanium, zinc, germanium, indium, tin, antimony, and cerium.

As these oxides, for example, silica, alumina, zirconia, titania, zinc oxide, germanium oxide, indium oxide, tin oxide, indium-tin oxide (ITO), antimony oxide, and cerium oxide can be given. Of these, silica, alumina, zirconia, and antimony oxide are preferable from the viewpoint of high hardness. These may be used either individually or in combinations of two or more. In addition, oxide particles ($A_1$) of these elements are preferably in the form of a powder or a solvent dispersion sol. When the oxide particles ($A_1$) are in the form of a dispersion, an organic solvent is preferable as a dispersion medium from the viewpoint of mutual solubility with other components and dispersibility. Examples of organic solvents are alcohols for example methanol, ethanol, isopropanol, butanol, and octanol; ketones, for example acetone, methyl ethyl ketone, methyl isobutyl ketone, and cyclohexanone; esters, for example ethyl acetate, butyl acetate, ethyl lactate, and γ-butyrolactone; ethers, for example ethylene glycol monomethyl ether and diethylene glycol monobutyl ether; aromatic hydrocarbons, for example benzene, toluene, and xylene; and amides, for example dimethylformamide, dimethyl acetamide, and N-methylpyrrolidone. Of these organic solvents, methanol, isopropanol, butanol, methyl ethyl ketone, methyl isobutyl ketone, ethyl acetate, butyl acetate, toluene, and xylene are preferable.

The number average particle diameter of the oxide particles is preferably in the range from 0.001 $\mu$m to 2 $\mu$m, more preferably 0.001 $\mu$m to 0.2 $\mu$m, and most preferably 0.001 $\mu$m to 0.1 $\mu$m. If the number average particle diameter is more than 2 $\mu$m, transparency and surface conditions of the cured product tend to be impaired. Moreover, various surfactants and amines may be added to improve dispersibility of the particles.

Among silicon oxide particles, given as examples of commercially available products of silica particles are colloidal silica available under the trade names Methanol Silica Sol, IPA-ST, MEK-ST, NBA-ST, XBA-ST, DMAC-ST, ST-UP, ST-OUP, ST-20, ST-40, ST-C, ST-N, ST-O, ST-50, ST-OL, (manufactured by Nissan Chemical Industries, Ltd.). As powdery silica, products available under the trade names AEROSIL 130, AEROSIL 300, AEROSIL 380, AEROSIL TT600, and AEROSIL OX50 (manufactured by Japan Aerosil Co., Ltd.), Sildex H31, H32, H51, H52, H121, H122 (manufactured by Asahi Glass Co., Ltd.), E220A, E220 (manufactured by Nippon Silica Industrial Co., Ltd.), SYLYSIA470 (manufactured by Fuji Silycia Chemical Co. Ltd.), and SG Flake (manufactured by Nippon Sheet Glass Co., Ltd.), and the like can be given.

Other commercially available products include aqueous dispersion products of alumina are Alumina Sol-100, -200, -520 (trade names, manufactured by Nissan Chemical Industries, Ltd.); as isopropanol dispersion products of alumina, AS-150I (trade name, manufactured by Sumitomo Osaka Cement Co., Ltd.); as toluene dispersion products of alumina, AS-150T (trade name, manufactured by Sumitomo Osaka Cement Co., Ltd.); as aqueous dispersion products of zinc antimonate powder, Selnax (trade name, manufactured by Nissan Chemical Industries, Ltd.); as powders and solvent dispersion products of alumina, titanaium oxide, tin oxide, indium oxide, zinc oxide, etc., NanoTek, for example, (trade name, manufactured by CI Kasei Co., Ltd.); as an aqueous dispersion sol of antimony dope-tin oxide, SN-100D (trade name, manufactured by Ishihara Sangyo Kaisha, Ltd.); as an ITO powder, a product manufactured by Mitsubishi Material Co., Ltd.; and as aqueous dispersion products of cerium oxide, Needral (trade name, manufactured by Taki Chemical Co., Ltd.).

The shape of oxide particles ($A_1$) may be globular, hollow, porous, rod-like, plate-like, fibrous, or amorphous, with a globular shape being preferable. The specific surface area of oxide particles (determined by the BET method using nitrogen) is preferably in the range from 10 to 1000 $m^2/g$, and more preferably from 100 to 500 $m^2/g$. These oxide particles can be used either in the form of a dry powder or a dispersion in water or an organic solvent. For example, a dispersion liquid of fine particles of oxide known in the art as a solvent dispersion sol of these oxides can be directly used. The use of a solvent dispersion sol of oxide is particularly preferable in the application in which excellent transparency of cured products is required.

1.2. Specific Organic Compound ($A_2$)

The specific organic compound ($A_2$) which is used in the present invention is a compound having a polymerizable unsaturated group and the group of the above formula (1) in the molecule. It is preferable that such a compound ($A_2$) have a silanol group or a group which forms a silanol group by hydrolysis in the molecule.

1.3. Polymerizable Unsaturated Group

There are no specific limitations to the polymerizable unsaturated group contained in the specific organic compound. An acryloyl group, methacryloyl group, vinyl group, propenyl group, butadienyl group, styryl group, ethynyl group, cinnamoyl group, maleate group, and acrylamide group, can be given as preferable examples.

This polymerizable unsaturated group is a structural unit to effect an addition polymerization by reactive radicals.

1.4. The Group Shown by the Above Formula (1)

There are 6 types for the group [—X—C (=Y)—NH—] of the formula (1) contained in the specific organic compound ($A_2$), specifically, they are [—O—C(=O)—NH—], [—O—C(=S)—NH—], [—S—C(=O)—NH—], [—NH—C(=O)—NH—], [—NH—C(=S)—NH—], and [—S—C(=S)—NH—].

These groups may be used either individually or in combinations of two or more. Among these, the combined use of the group [—O—C(=O)—NH—] and at least one of the groups [—O—C(=S)—NH—] and [—S—C(=O)—NH—] is preferable from the viewpoint of ensuring excellent heat stability.

The above-mentioned group [—X—C (=Y)—NH—] of the formula (1) is considered to generate a moderate cohesive force by a hydrogen bond among molecules, which provides the cured products with characteristics such as superior mechanical strength, excellent adhesion properties to substrates, and good heat resistance.

1.5. Silanol Group or a Group which Forms a Silanol Group by Hydrolysis

The specific organic compound ($A_2$) is preferably a compound having a silanol group (hereinafter may be called "silanol group-containing compound") or a compound which forms a silanol group by hydrolysis (hereinafter may be called "silanol group-forming compound"). As the silanol group-forming compound, a compound having an alkoxy group, aryloxy group, acetoxy group, amino group, halogen group, or the like on a silicon atom can be given, with a compound including an alkoxy group or aryl oxy group on a silicon atom, specifically, an alkoxysilyl group-containing compound or an aryloxysilyl group-containing compound being preferable.

The silanol group or the silanol group-forming forming site of the silanol group-forming compound is the structural unit which bonds with the oxide particle by a condensation reaction or the condensation reaction after hydrolysis.

1.6. Preferable Embodiment

The compounds shown by the following formula (2) can be given as examples of preferable specific organic compounds ($A_2$).

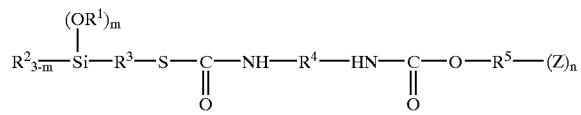

(2)

wherein $R^1$ and $R^2$ individually represent a hydrogen atom or an alkyl group or aryl group having 1–8 carbon atoms such as a methyl group, ethyl group, propyl group, butyl group, octyl group, phenyl group, xylyl group, and the like, and m is 1, 2, or 3.

Examples of the group represented by [$(R^1O)_m R^2_{3-m}$Si—] are a trimethoxysilyl group, triethoxysilyl group, triphenoxysilyl group, methyldimethoxysilyl group, dimethylmethoxysilyl group. Of these groups, the trimethoxysilyl group, and the triethoxysilyl group, are preferable.

$R^3$ is a divalent organic group having a $C_1$–$C_{12}$ aliphatic or aromatic structure which may include a linear, branched, or cyclic structure. A methylene, ethylene, propylene, butylene, hexamethylene, cyclohexylene, phenylene, xylylene, dodecamethylene, and the like can be given as such organic groups. Of these, preferable groups are methylene, propylene, cyclohexylene, and phenylene.

$R^4$ is a divalent organic group, and usually selected from the divalent organic groups having a molecular weight from 14 to 10,000, and preferably from 76 to 500. Examples of $R^4$ are a linear polyalkylene group for example hexamethylene, octamethylene, and dodecamethylene; an alicyclic or polycyclic divalent organic group for example cyclohexylene and norbornylene; a divalent aromatic group for example phenylene, naphthylene, biphenylene, and polyphenylene; and an alkyl group or aryl group substitution product of these groups. Moreover, these divalent organic groups may include groups having an element other than a carbon atom and hydrogen atom, and may further include a polyether bond, polyester bond, polyamide bond, polycarbonate bond, and the group shown by the above-mentioned formula (1).

$R^5$ is an organic group of an (n+1) valence, and preferably selected from the group consisting of linear, branched, or cyclic saturated or unsaturated hydrocarbon groups.

Z is a monovalent organic group having a polymerizable unsaturated group in the molecule which causes an intermolecular cross-linking reaction in the presence of active radicals. Examples of Z are an acryloyl(oxy) group, methacryloyl(oxy) group, vinyl(oxy) group, propenyl(oxy) group, butadienyl(oxy) group, styryl(oxy) group, ethynyl (oxy) group, cinnamoyl(oxy) group, maleate group, acrylamide group, and a methacrylamide group. Among these, an acryloyl(oxy) group and methacryloyl(oxy) group are preferable. Moreover, n is a integer preferably from 1 to 20, and more preferably from 1 to 10, and particularly preferably from 1 to 5.

The organic compound used in the present invention can be synthesized by a method disclosed in Japanese Patent Application Laid-open No. 100111/1997, for example. Specifically, a method ($\alpha_1$) comprising an addition reaction of a mercaptoalkoxysilane, a polyisocyanate compound, and an active hydrogen group-containing polymerizable unsaturated compound can be used. Another method ($\alpha_2$) comprises a direct reaction of a compound having both an alkoxy silyl group and an isocyanate group in the molecule with an active hydrogen-containing polymerizable unsaturated compound. Still another method ($\alpha_3$) comprises directly synthesizing by an addition reaction of a compound having both a polymerizable unsaturated group and an isocyanate group in the molecule with a mercapto alkoxysilane compound or amino silane compound.

Among these methods, the method ($\alpha_1$) is preferably used to synthesize the compound shown by the above-mentioned formula (2). These methods are more specifically described.

More specifically, for example, there can be given the method ($\alpha_1$) of producing an intermediate compound having an alkoxy silyl group, a group [—S—C(=O)NH—], and an isocyanate group in the molecule by reacting mercaptoalkoxysilane and a polyisocyanate compound, then combining this unsaturated compound via the group [—S—C (=O)NH—] by reacting a hydroxyl group-containing polymerizable unsaturated compound with the isocyanate group which is present in the intermediate compound.

Another method ($\alpha_4$) comprises forming an intermediate compound having a polymerizable unsaturated group, a group [—O—C(=O)—NH—] and an isocyanate group in the molecule by reacting a polyisocyanate compound and a hydroxyl group-containing polymerizable unsaturated compound to, and then combining the mercaptoalkoxysilane via the group [—S—C(=O)—NH—] by reacting the intermediate compound with mercaptoalkoxysilane.

Among the two methods, the method ($\alpha_1$) is preferred because this method exhibits no decreases in the polymerizable unsaturated group by the Michael addition reaction.

In the synthesis of the compound shown by the above-mentioned formula (2), a compound having at least one alkoxy silyl group and at least one mercapto group in the molecule can be given as an example of the alkoxysilane which can form the group [—S—C(=O)—NH—] by the reaction with an isocyanate group. As such a mercaptoalkoxysilane, for example, mercaptopropyltrimethoxysilane, mercaptopropyltriethoxysilane, mercaptopropylmethyldiethoxysilane, mercaptopropyldimethoxymethylsilane, mercaptopropylmethoxydimethylsilane, mercaptopropyltriphenoxysilane, mercaptopropyltributoxysilane, and the like can be given. Among these, mercaptopropyltrimethoxysilane and mercaptopropyltriethoxysilane are preferable. Moreover, an addition compound of an amino-substituted alkoxysilane to an epoxy-substituted mercaptan and an addition compound of $\alpha,\omega$-dimercapto compound to an epoxysilane can also be used.

The polyisocyanate compound used for synthesizing the specific organic compound can be selected from polyisocyanate compounds of a linear saturated hydrocarbon, cyclic saturated hydrocarbon, or aromatic hydrocarbons.

As examples of such a polyisocyanate compound, 2,4-tolylene diisocyanate, 2,6-tolylene diisocyanate, 1,3-xylylene diisocyanate, 1,4-xylylene diisocyanate, 1,5-naphthylene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethyl phenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, lysine diisocyanate, hydrogenated diphenylmethane diisocyanate, 1,3-bis(isocyanatemethyl) cyclohexane, tetramethyl xylylene diisocyanate, and 2,5 (or 6)-bis(isocyanatemethyl)-bicyclo[2.2.1]heptane can be given. Among these, 2,4-tolylene diisocyanate, isophorone diisocyanate, xylylene diisocyanate, methylenebis(4-cyclohexylisocyanate), 1,3-bis(isocyanatemethyl)cyclohexane, and the like are preferable. These may be used either individually or in combinations of two or more.

As examples of the active hydrogen-containing polymerizable unsaturated compound which can be bonded through the group [—O—C(=O)—NH—] by the addition reaction of the above-mentioned polyisocyanate compound used in the synthesis of the specific organic compound, compounds having at least one active hydrogen atom which can form the group [—O—C(=O)—NH—] by the addition reaction with an isocyanate group and at least one polymerizable unsaturated group in the molecule can be given.

Given as examples of such active hydrogen-containing polymerizable unsaturated compounds are 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butanediol mono (meth)acrylate, 2-hydroxyalkyl (meth)acryloyl phosphate, 4-hydroxycyclohexyl (meth)acrylate, 1,6-hexanediol mono (meth)acrylate, neopentyl glycol mono(meth)acrylate, trimethylolpropane di(meth)acrylate, trimethylolethane di(meth)acrylate, pentaerythritol tri(meth)acrylate, and dipentaerythritol penta(meth)acrylate. In addition, compounds obtained by the addition reaction of a glycidyl group-containing compound such as alkyl glycidyl ether, aryl glycidyl ether, or glycidyl (meth)acrylate with (meth)acrylic acid can also be used. Of these compounds, 2-hydroxyethyl (meth)acrylate, 2-hydroxypropyl (meth)acrylate, pentaerythritol tri(meth)acrylate, and the like are preferable.

These compounds may be used either individually or in combinations of two or more.

1.7. Compound ($A_3$)

Crosslinkable particles (A) preferably also comprise compound ($A_3$) for obtaining improved dispersion stability and storage stability without producing any depositions or precipitates and without increasing the viscosity or generating gels during storage.

The compound ($A_3$) which is preferably used in the present invention does not have a polymerizable unsaturated group, but includes a silanol group or a group which forms a silanol group by hydrolysis. The compound ($A_3$) differs from the above-mentioned compound ($A_2$) in that the compound ($A_3$) does not have a polymerizable unsaturated group in the molecule. The significance of the silanol group or the group which forms a silanol group by hydrolysis in the compound ($A_3$) is the same as those in the compound ($A_2$).

As examples of the compound ($A_3$), the silanol group-containing compounds shown by the following general formula (3) or hydrolyzable silanes can be given:

$$(R^6)_a(R^7)_b(R^8)_c Si(R^9)_d \qquad (3)$$

wherein a, b, c, and d are individually an integer from 0 to 4, provided that a+b+c+d=4; R6, R7, and R8 are monovalent organic groups; and R9 is a monovalent organic group.

Here, R6, R7, and R8 may be either the same or different and are selected from monovalent organic groups having 1 to 20 carbon atoms, such as alkyl groups, aryl groups, and aralkyl groups. Of these, alkyl groups are preferred, with those having 1–8 carbon atoms being particularly preferred.

Given as specific examples of R6, R7, and R8 are alkyl groups such as a methyl group, ethyl group, n-propyl group, isopropyl group, n-butyl group, isobutyl group, t-butyl group, sec-butyl group, n-hexyl group, cyclohexyl group, n-octyl group, 2-ethylhexyl group, n-decyl group, n-hexadecanyl group, and n-octadecanyl group; aryl groups such as a phenyl group, xylyl group, biphenyl group, and naphthyl group; and aralkyl groups such as a benzyl group and tolyl group.

R9 is a hydroxyl group (OH group) or a group which forms a silanol group (—Si—OH) by hydrolysis, such as, for example, a hydrogen atom, halogen atom, alkoxy group, aryloxy group, aralkyloxy group, acyloxy group, amino group, mercapto group, alkylthio group, and iminooxy group).

Among these, preferable groups are alkoxy groups, aryloxy groups, acyloxy groups, and iminooxy groups, and particularly preferable groups are alkoxy groups and aryloxy groups. Given as specific examples of such hydrolyzable groups are halogen atoms such as Cl, Br, F, and the like; alkoxy groups such as methoxy group, ethoxy group, n-propoxy group, iso-propoxy group, n-butoxy group, iso-butoxy group, t-butoxy group, an sec-butoxy group; aryloxy groups such as phenoxy group and biphenyloxy group; aralkyloxy groups such as benzyloxy group and phenylethoxy group; acyloxy groups such as acetoxy group and benzoyloxy group; amino groups such as N,N-dimethylamino group, N,N-dibutylamino group, and N-methyl-N-phenylamino group; mercapto groups; alkylthio groups such as methylthio group and ethylthio group; and iminooxy groups such as methylimino oxy group, ethyliminooxy group, and phenyliminooxy group.

Given as hydrolyzable silanes among the compounds shown by the formula (3) are trimethylmethoxysilane, trimethylethoxysilane, trimethylchlorosilane, trimethylacetoxysilane, trimethyl-N,N-dimethylaminosilane, trimethyl-N-methyliminooxyysilane, dimethyldimethoxysilane, dimethyldiethoxysilane, dimethyldichlorosilane, dimethyldiacetoxysilane, methyltrichlorosilane, methyltrimethoxysilane, methyltriethoxysilane, methyltriacetoxysilane, tetrachlorosilane, tetramethoxysilane, tetraethoxysilane, tri-n-butylchlorosilane, tri-n-butylmethoxysilane, tri-n-butylethoxysilane, tri-n-butylaminosilane, tri-n-butylacetoxysilane, phenyldimethylchlorosilane, phenyldimethylmethoxysilane, phenyldimethylethoxysilane, phenyldimethylacetoxysilane, di-n-butyldichlorosilane, di-n-butyldimethoxysilane, di-n-butyldiacetoxysilane, isopropyltrichlorosilane, isopropyltrimethoxysilane, n-butyltrichlorosilane, n-butyltrimethoxysilane, n-hexyltrimethoxysilane, n-butyltriethoxysilane, n-hexyltrichlorosilane, n-octyltrichlorosilane, n-octyltrimethoxysilane, n-decyltrichlorosilane, n-decyltrimethoxysilane, n-dodecyltrichlorosilane, n-dodecyltrimethoxysilane, n-octadecyltrichlorosilane, n-octadecyltrimethoxysilane, phenyltrichlorosilane, phenyltrimethoxysilane, and phenyltriethoxysilane.

1.8. The Proportion of Oxide Particles ($A_1$), Compound ($A_2$), and Compound ($A_3$)

The proportion of the oxide particles ($A_1$), compound ($A_2$), and compound ($A_3$) in the crosslinkable particles (A) (for 100 wt % of the total of the components ($A_1$), ($A_2$), and ($A_3$)) will now be described. The amount of the crosslinkable particles here means the amount of the solid components and does not include the amount of solvents when the crosslinkable particles are used in the form of a solvent dispersion sol (a dispersion liquid).

The oxide particles ($A_1$) are incorporated in an amount from 5–98.9 wt %, and preferably from 10–97.5 wt %. If less than 5 wt %, hardness and scratch resistance of the cured products produced from the composition containing the crosslinkable particles may not be sufficient. If more than 98.9 wt %, dispersibility and coatability of the composition which contains the crosslinkable particles, and scratch resistance of the cured products may not be sufficient.

The compound ($A_2$) is incorporated in an amount from 1–90 wt %, and preferably from 2–80 wt %. If less than 1 wt %, scratch resistance of the cured products may not be sufficient; if more than 90 wt %, hardness of the cured products may not be sufficient.

The compound ($A_3$) is preferably incorporated in an amount from 0.1–50 wt %, and more preferably from 0.5–40 wt %. If less than 0.1 wt %, dispersion stability and storage stability may not be sufficient; if more than 50 wt %, hardness of the cured products may not be sufficient.

1.9. Preparation of Crosslinkable Particles (A)

Although there are no specific limitations to the method for preparing the crosslinkable particles (A) used in the present invention, a method of reacting the above-mentioned specific organic compound and oxide particles can be given as an example. Oxide particles ($A_1$) are known to have moisture on the surface of particles as adsorption water under usual storage conditions. In addition, components which react with a silanol group-forming compound such as a hydroxide, hydrate, or the like are presumed to be present at least on the surface of the oxide particles. Therefore, the crosslinkable particles (A) can be produced by mixing the silanol group-forming compound and oxide particles ($A_1$), and heating the mixture while stirring. It is preferable that the reaction be carried out in the presence of water to efficiently bind the silanol group-forming site possessed by the specific organic compound ($A_2$) and the oxide particle ($A_1$). However, water is not required when the specific organic compound ($A_2$) and (optionally) compound ($A_3$) posses silanol groups. Therefore, the crosslinkable particles (A) can be prepared for example by a method which includes at least the operation to blend the oxide particles ($A_1$), the specific organic compound ($A_2$) and (optionally) compound ($A_3$).

The method for the preparation of crosslinkable particles (A) will now be described in detail.

In this example, the crosslinkable particles are prepared by two steps, that is, a first step of hydrolyzing the compound ($A_2$) and bonding the hydrolyzed compound to oxide particles ($A_1$), and a second step of hydrolyzing the compound ($A_3$) and bonding the particles obtained in the first step to the hydrolyzed compound obtained from compound ($A_3$). Hydrolysis may be omitted, when the compound ($A_2$) and compound ($A_3$) are not silanol group-forming compounds, but silanol group-containing compounds.

The above two steps will now be described in more detail.

First Step

The first step comprises reacting a mixture of oxide particles ($A_1$) and a solvent or oxide particles ($A_1$) dispersed in a solvent with the compound ($A_2$) to bond oxide particles ($A_1$) and the compound ($A_2$) (such bonded particles may be hereinafter referred to as "intermediate particles"). Specifically, the oxide particles ($A_1$), the compound ($A_2$), and water are blended under the following conditions to produce the intermediate particles.

Here, p-methoxyphenol for example, may be added as a thermal polymerization inhibitor.

The same solvent as used as a dispersion medium for the solvent dispersion sol of the oxide particles ($A_1$) can be used as a solvent.

The temperature for the reaction may be between the temperature at which the solutes do not precipitates and the boiling point of the solvent, with the preferable temperature range being from 0 to 150° C.

There are no specific restrictions to the manner of stirring inasmuch as the mixture can be homogeneously mixed.

The reaction is carried out usually in an atmosphere of a dry gas such as nitrogen or air, with dry air being preferred. A reaction time within which the reaction is sufficiently completed, for example, from 5 minutes to 24 hours, and preferably from one hour to 8 hours, can be applied.

Second Step

The second step comprises reacting the intermediate particles produced in the first step and the compound ($A_3$), thereby obtaining crosslinkable particles in which the intermediate particles are bonded with the compound ($A_3$). Specifically, the intermediate particles, the compound ($A_3$), and water are mixed under the following conditions to produce crosslinkable particles.

The temperature for the reaction may be between the temperature at which the solutes do not precipitates and the boiling point of the solvent, with the preferable temperature range being from 0 to 150° C.

There are no specific restrictions to the manner of stirring inasmuch as the mixture can be homogeneously mixed.

The reaction is carried out usually in an atmosphere of a dry gas such as nitrogen or air, with dry air being preferred. A reaction time within which the reaction is sufficiently completed, for example, from 5 minutes to 24 hours, and preferably from one hour to 8 hours, can be applied.

The crosslinkable particles can be obtained by bonding the oxide particles ($A_1$), compound ($A_2$), and compound ($A_3$) through first and second steps in this manner.

As mentioned above, it is desirable to produce the crosslinkable particles by first treating with the compound ($A_2$), followed by a treatment with the compound ($A_3$).

Taking the case using silica particles as the oxide particles ($A_1$) as an example, both impaired storage stability and inferior coating surfaces are associated with dispersion stability of the crosslinkable particles in the composition. Because the compound ($A_2$) is relatively bulky, the treatment only with the compound ($A_2$) cannot completely restrain the silanol group on the surface of particles from condensing after the treatment. However, successive treatment with the compound ($A_3$) with a relatively small molecular size is presumed to effect a smooth bonding on the surface of the particles, whereby the remaining silanol groups can be reduced more efficiently, resulting in improved dispersion stability of particles.

If the treatment with the compound ($A_3$) is carried out simultaneously with or prior to the treatment with the compound ($A_2$), dispersion stability of particles may be impaired, which results in impaired storage stability of the coating material and an inferior coating film appearance.

More detailed description of the method of producing the crosslinkable particles will now be presented.

The amount of each of the compound ($A_2$) and the compound ($A_3$) bonded to the oxide particles ($A_1$) is 0.01 wt % or more, preferably 0.1 wt % or more, and particularly preferably 1 wt % or more, in the crosslinkable particles. If the amount of either the compound ($A_2$) or the compound ($A_3$) bonded with the oxide particles ($A_1$) is less than 0.01 wt %, dispersibility of the crosslinkable particles in the composition may be insufficient, which may result in cured products with insufficient transparency and scratch resistance. The amount of the oxide particles ($A_1$) used in the raw materials for preparing the crosslinkable particles is preferably from 5–99 wt %, and more preferably from 10–98 wt %.

The method for preparing the crosslinkable particles will now be described in more detail for the case where the alkoxysilane compound shown by the above-mentioned formula (2) is used as a silanol group-forming compound.

The amount of water consumed in the hydrolysis of the alkoxysilane compound in the preparation of the crosslinkable particles may be the amount sufficient to hydrolyze at least one alkoxy group on the silicon atom in one molecule. Preferably, the amount of water which is added or present during the hydrolysis reaction is one third (⅓) or more of the number of mols of the total alkoxy groups on the silicon atoms of the alkoxysilane compound, with particularly preferable amount being from ½ to 3 times of the number of mols of the total alkoxy groups. The product obtained by mixing the alkoxysilane compound and the oxide particles ($A_1$) under the conditions where no moisture is present is a product wherein the alkoxysilane compound has physically absorbed on the surface of oxide particles ($A_1$). The cured products made from the composition which includes such crosslinkable particles can exhibit only insufficient hardness and scratch resistance.

The methods which can be selected for the preparation of crosslinkable particles (A) include a method of separately hydrolyzing the above-mentioned alkoxysilane compound, and mixing the hydrolyzed product with a powder of oxide particles or a solvent dispersion sol of oxide particles with heating and stirring; a method of carrying out the hydrolysis of the alkoxysilane compound in the presence of the oxide particles; and a method of treating the surface of the oxide particles in the presence of, for example, (D) the polymerization initiator and the like. Among these, the method of hydrolyzing the alkoxysilane compound in the presence of oxide particles is preferable. The treatment for the preparation of the crosslinkable particles (A) is carried out at a temperature from 0 to 150° C., preferably from 20 to 100. The treating time is usually from 5 minutes to 24 hours.

When oxide particles in the form of a powder are used in the preparation of the crosslinkable particles (A), an organic solvent may be added to ensure a smooth and homogeneous reaction with the alkoxysilane compound. The same solvents as used as the above-mentioned dispersion medium for the solvent dispersion sol of oxide particles can be used as such an organic solvent. There are no specific limitations to the types of these solvents, in as much as a smooth and homogeneous reaction is ensured.

When a solvent dispersion sol is used as the raw material for the crosslinkable particles (A), the crosslinkable particles (A) can be prepared by a process comprising at least a step of mixing the solvent dispersion sol and the specific organic compound. Here, an organic solvent which is mutually soluble with water can be added to ensure homogeneity in the initial stage of the reaction and smooth reaction.

Moreover, an acid, salt, or base may be added as a catalyst to accelerate the reaction to produce the crosslinkable particles (A).

Given as examples of the acid are inorganic acids such as hydrochloric acid, nitric acid, sulfuric acid, and phosphoric acid, organic acids such as methanesulfonic acid, toluenesulfonic acid, phthalic acid, malonic acid, formic acid, acetic acid, and oxalic acid, as well as unsaturated organic acids such as methacrylic acid, acrylic acid, and itaconic acid. As examples of the salt, ammonium salts such as tetramethylammonium chloride and tetrabutylammonium chloride can be given. Given as examples of the base, aqueous ammonia; primary, secondary, or tertiary aliphatic amines such as diethylamine, triethylamine, dibutylamine, and cyclohexylamine; aromatic amines such as pyridine; sodium hydroxide, potassium hydroxide; as well as tertiary ammonium hydroxides such as tetramethylammonium hydroxide, tetrabutylammonium hydroxide, and the like.

Among these, preferable catalysts are acids such as organic acids and unsaturated organic acids, and bases such as tertiary amines and quaternary ammonium hydroxide. The amount of these acids, salts, or bases to be added is preferably from 0.001 to 1.0 part by weight, and more preferably from 0.01 to 0.1 part by weight, for 100 parts by weight of the alkoxysilane compounds.

Preferably, a dehydrating agent is added to promote the reaction.

As a dehydrating agent, inorganic compounds such as zeolite, anhydrous silica, and anhydrous alumina, and organic compounds such as methyl orthoformate, ethyl orthoformate, tetraethoxymethane, and tetrabutoxymethane can be used. Of these, the organic compounds are preferred, with ortho esters such as methyl orthoformate, ethyl orthoformate being particular preferred.

The amount of alkoxysilane compound bonded with the crosslinkable particles (A) can be determined as a weight loss (%) when a dry powder is burnt completely in air in a thermogravimetric analysis from 110 to 800° C.

The amount of crosslinkable particles (A) incorporated in the resin composition is 5–90 wt %, and preferably 10–70 wt %, for 100 wt % of the composition (the total of the crosslinkable particles (A) and compound (B)). If less than 5 wt %, hardness of the cured products may be insufficient; if more than 90 wt %, there may be the occasion where coatings are not cured and no films can be produced. The amount of the crosslinkable particles (A) here means the amount of the solid components and does not include the amount of solvents when the crosslinkable particles (A) are used in the form of a solvent dispersion sol.

2. Compound (B)

The compound having four or more polymerizable unsaturated groups in the molecule (hereinafter called the compound (B)) is used in the composition of the present invention to increase the cross-linking density and hardness of the cured products.

Although there are no specific limitations to the compound (B), (meth)acrylate compounds containing four or more (meth)acryloyl groups in the molecule are preferred, particularly (meth)acrylates containing four or more (meth)acryloyl groups, each having 150 or less daltons being preferred. If more than 150, hardness of cured products may be insufficient. Given as examples of such a compound (B) are dipentaerythritol hexa(meth)acrylate, dipentaerythritol penta(meth)acrylate, pentaerythritol tetra(meth)acrylate, ditrimethylolpropane tetra(meth)acrylate, ethylene oxide or propylene oxide addition compounds of these (meth) crylates, as well as oligo ester (meth)acrylates, oligo ether (meth)acrylates, oligo urethane (meth)acrylates, and oligo epoxy (meth)acrylates having four or more (meth)acryloyl groups in the molecule.

Of these, dipentaerythritol hexa(meth)acrylate, dipentaerythritolhydroxy penta(meth)acrylate, pentaerythritol tetra(meth)acrylate, ditrimethylolpropane tetra(meth) acrylate, and the like are preferable.

As examples of commercially available products of the compound (B), Aronix M-400, M-408, M-450 (manufactured by Toagosei Co., Ltd.), KAYARAD D-310, D-330, DPHA, DPCA-20, DPCA-30, DPCA-60, DPCA-120, SR-295, SR-355, SR-399E, SR-494, SR-9041 (manufactured by Nippon Kayaku Co., Ltd.), Light Acrylate PE-4A, DPE-6A, DTMP-4A (manufactured by Kyoeisha Chemical Co., Ltd.), and the like can be given.

The amount of compound (B) incorporated in the composition of the present invention is from 5–75 wt %, and preferably from 10–60 wt %, for 100 wt % of the composition (the total of the components (A), (B), and (C)). If less than 5 wt %, hardness of the cured products is insufficient; if more than 75 wt %, a large curl may occur in the cured products.

3. Compound C

The compound having one to three polymerizable unsaturated groups in the molecule (hereinafter called the compound (C)) is used in the composition of the present invention to improve the curling property of cured products without decreasing the hardness. Although there are no limitations to the compound (C), the compounds having a (meth)acryloyl group or vinyl group as the polymerizable unsaturated group can be given as examples. Specifically, (meth) acrylic esters, N-vinyl compounds, vinyl-substituted aromatics, vinyl ethers, and vinyl esters can be given. Of these, (meth) acrylic esters and N-vinyl compounds are preferred, with (meth) acrylic esters being particularly preferred. Among the (meth) acrylic esters, di-functional or tri-functional (meth)acrylates in which each (meth)acryloyl group has 200 daltons or less are preferred. If more than 200, hardness of cured products may be insufficient.

Specific examples are given below.

As (meth)acrylic esters, trimethylolpropane tri(meth) acrylate, pentaerythritol tri(meth)acrylate, glycerol tri(meth) acrylate, tris(2-hydroxyethyl) isocyanurate tri(meth) acrylate, ethylene glycol di(meth)acrylate, propylene glycol (meth)acrylate, 1,3-butanediol di(meth)acrylate, 1,4-butanediol di(meth)acrylate, 1,6-hexanediol di(meth) acrylate, neopentyl glycol di(meth)acrylate, diethylene glycol di(meth)acrylate, triethylene glycol di(meth)acrylate, dipropylene glycol di(meth)acrylate, bis(2-hydroxyethyl) isocyanurate di(meth)acrylate, ethylene oxide or propylene oxide addition poly(meth)acrylates to these (meth) acrylic esters; oligo ester (meth)acrylates, oligo ether (meth) acrylic esters, oligo urethane (meth) acrylic esters, and oligo epoxy (meth) acrylic esters having 1–3 (meth)acryloyl groups in the molecule; hydroxyethyl (meth)acrylate, hydroxypropyl (meth)acrylate, hydroxybutyl (meth)acrylate, and ethylene oxide or propylene oxide addition products to these (meth) acrylic esters; and mono(meth) acrylic esters such as iso-octyl (meth)acrylate, iso-decyl (meth)acrylate, stearyl (meth)acrylate, tetrahydrofurfuryl (meth)acrylate, phenoxyethyl (meth)acrylate can be given.

As N-vinyl compounds, N-vinyl pyrrolidone, N-vinyl caprolactam, N-vinyl phthalimide, N-vinyl succinimido, and the like can be given.

As vinyl substituted aromatics, styrene, divinylbenzene, chloromethylstyrene, hydroxystyrene, ?-methylstyrene, bromomethylstyrene, tribromomethylstyrene, and the like can be given.

As vinyl ethers, diethylene glycol monomethyl vinyl ether, ethylene glycol divinyl ether, diethylene glycol divinyl ether, triethylene glycol divinyl ether, and the like can be given.

As vinyl esters, vinyl acetate, vinyl propionate, vinyl benzoate, and the like can be given. Given as examples of commercially available products of the compound (C) are products available under the trade names Aronix M-101, M-102, M-110, M-111, M-113, M-117, M-120, M-150, M-156, M-208, M-210, M-215, M-220, M-225, M-233, M-240, M-245, M-260, M-270, M-305, M-309, M-310, M-315, M-320, M-350, M-360 (manufactured by Toagosei Co., Ltd.), KAYARAD TC-110S,TC-120S,R-128, HDDA, NPGDA, TPGDA, PEG400DA, MANDA, HX-220, HX-620, R-551, R-712, R-167, TMPTA, KS-HDDA, KS-TPGDA, KS-TMPTA, SR-256, SR-257, SR-285, SR-335, SR-339A, SR-395, SR-440, SR-489, SR-495, SR-504, SR-111, SR-212, SR-213, SR-230, SR-259, SR-268, SR-272, SR-344, SR-349, SR-601, SR-602, SR-610, SR-9003, SR-368, SR-415, SR-444, SR-454, SR-492, SR-499, SR-502, SR-9020, SR-9035 (manufactured by Nippon Kayaku Co., Ltd.); and the like.

The amount of compound (C) incorporated in the composition of the present invention is from 5–75 wt %, and preferably from 10–60 wt %, for 100 wt % of the composition (the total of the components (A), (B), and (C)). If less than 5 wt %, a large curl may occur in the cured products; if more than 75 wt %, hardness of the cured products may be insufficient.

The amount of the component (C) to the component (B) in composition of the present invention is preferably from 0.1 to 9900 parts by weight, and more preferably from 0.5 to 900 parts by weight, for 100 parts by weight of the component (B). If less than 0.1 part by weight, warp and curl of the cured products may increase; if more than 9900 parts by weight, scratch resistance may be insufficient.

In case the composition is used as a hardcoat on a norbornene type polymer, compound B or compound C preferably comprise a (meth)acrylic ester having an alicyclic structure.

There are no specific limitations to the (meth)acrylic ester having alicyclic structure used in the present invention, so long as the compound is a (meth)acrylic ester having a cyclic structure of saturated hydrocarbon in the ester substituent. For example, (meth)acrylic esters having a bicyclo[2.2.1] heptane ring, (meth)acrylic esters having a tricyclo[$5.2.1.0^{2,6}$]decane ring, (meth)acrylic esters having a tetracyclo [$6.2.1.0^{2,7}.1^{3,6}$]dodecane ring, can be given. Among these, at least one compound selected from the group consisting of (meth)acrylic esters having a bicyclo[2.2.1]heptane ring, (meth)acrylic esters having a tricyclo[$5.2.1.0^{2,6}$]decane ring, and (meth)acrylic esters having a tetracyclo[$6.2.1.0^{2,7}.1^{3,6}$] dodecane ring is preferable. The addition of these (meth) acrylic esters containing an alicyclic structure is indispensable to ensure strong adhesion of the resin composition to the surface of norbornene-type resins.

Given as specific examples of (meth)acrylic esters containing an alicyclic structure are cyclohexyl (meth)acrylate, dicyclopentenyl (meth)acrylate, dicyclopentanyl (meth) acrylate, dicyclopentanyloxyethyl (meth)acrylate, dicyclopentenyloxyethyl (meth)acrylate, isobornyl (meth)acrylate, tricyclodecanediyl di(meth)acrylate, and tetratricyclodecanediyldimetha di(meth)acrylate, as well as polymerizable monomers such as for example above-mentioned (meth) acrylates modified with ethylene glycol or propylene glycol. Also included are oligomers of norbornene-type resins, and photopolymerizable oligomers obtained by introducing a (meth)acryloyl group into an intermediate or monomer having an unsaturated double bond before hydrogenation by modifying them by the same synthetic method as the method for synthesizing the (meth)acrylic ester such as for example the above-mentioned dicyclopentanyl (meth)acrylate.

Preferable (meth)acrylic esters containing an alicyclic structure include dicyclopentanyl (meth)acrylate, tricyclodecanediyl di(meth)acrylate, tetratricyclodecanediyl di(meth)acrylate, and the like.

4. Polymerization Initiator (D)

In addition to the above-mentioned crosslinkable particles (A), the compound (B), and the compound (C), a polymerization initiator (D) may optionally be added to the composition of the present invention. First, a curing method of the composition of the present invention will be described in relation to the use of the polymerization initiator (D).

The composition of the present invention is cured by heat and/or radioactive rays.

When the composition is cured by heat, an electric heater, infrared ray lamp, hot blast, and the like can be used as the heat source.

When radioactive rays are used, there are no specific limitations to the source of the radioactive rays so long as the composition can be cured in a short time after coating. As the source of infrared rays, for example, a lamp, resistance heating plate, laser, and the like can be given. Examples of the source of visible rays are sunlight, a lamp, fluorescent lamp, and laser. Examples of sources of ultraviolet rays are a mercury lamp, halide lamp, and laser. As examples of the source of electron beams, a system of utilizing thermoelectrons produced by a commercially available tungsten filament, a cold cathode method generating electron beams by passing a high voltage pulse through a metal, and a secondary electron method which utilizes secondary electrons produced by collision of ionized gaseous molecules and a metal electrode can be given. As the source of α-rays, β-rays, and γ-rays, for example, fissionable materials for example $Co^{60}$ can be given. These radioactive rays can be used either individually or in combinations of two or more. It is possible to irradiate a single or two or more radioactive rays intermittently at prescribed intervals. A polymerization initiator (D) may be added to shorten the period of time to cure the composition of the present invention. Compounds commonly used as a polymerization initiator which can produce active radicals by heat or by irradiation of radioactive rays can be used as the polymerization initiator (D).

In the present invention, it is preferable to use a radiation-active initiator as the polymerization initiator (D). Particularly, the use of a radiation polymerization initiator (d) including either or both of an aryl ketone having a 1-hydroxycyclohexyl group and an aryl ketone having an N-morpholino group (hereinafter may be called radiation-active initiator (d)) is preferable. When only an aryl ketone having a 1-hydroxycyclohexyl group is added, scarcely colored cured products can be formed within a short time. On the other hand, if only an aryl ketone having an N-morpholino group is added, cured products with superior surface hardness can be formed within a short time. If the both compounds are used jointly, scarcely colored cured products with high surface hardness can be formed within a short time.

As examples of the aryl ketone having a 1-hydroxycyclohexyl group, 1-hydroxycyclohexyl phenyl ketone, 1-hydroxycyclohexyl isopropylphenyl ketone, 1-hydroxycyclohexyldodecyl phenyl ketone, and the like can be given. There are no specific limitations to the aryl ketones having an N-morpholino group used in the present invention. Given as examples are: 2-methyl-1-[4-(methylthio)phenyl]-2-morpholinopropanone-1,2-methyl-1-[4-(methoxy)phenyl]-2-morpholinopropanone-1,2-methyl-1-[4-(2-hydroxyethoxy)phenyl-2-morpholinopropanone-1, 2-methyl-1-[4-(dimethylamino)phenyl-2-morpholinopropanone-1,2-methyl-1-[4-(diphenylamino) phenyl]-2-morpholinopropanone-1,2-benzyl-2-dimethylamino-1-(4-morpholinophenyl)-butanone-1,3,6-bis (2-methyl-2-morpholinopropionyl)-9-N-octylcarbazole, and the like.

These radiation polymerization initiators (d) can be used either individually or in combinations of two or more. To increase the cure speed and the hardness of the cured products both the surface area and inside the products, a combined use of the aryl ketones having 1-hydroxycyclohexyl group and the aryl ketones having an N-morpholino group is preferable.

As commercially available products of such a radiation initiator (d), Irgacure 184, 907 (manufactured by Ciba Specialty Chemicals Co., Ltd.), and the like can be given.

The amount of the radiation polymerization initiator (d) which is optionally used in the composition of the present invention is from 0.01–20 wt %, and preferably from 0.1–10 wt %, for 100 wt % of the composition (the total of the crosslinkable particles (A) and the compound (B)). If less than 0.01 wt %, hardness of the cured products may be insufficient; if more than 20 wt %, the inner layer may remain uncured when the product subjected to a curing operation.

When the aryl ketone having a 1-hydroxycyclohexyl group and the aryl ketone having an N-morpholino group are used jointly, the ratio by weight of these ketons is preferably from 10:90 to 90:10, and more preferably from 40:60 to 80:20.

5. Mixed Solvent (E)

Preferably, the crosslinkable resin composition of the present invention also comprise a solvent or a mixture of solvents: Most preferably a mixture of solvents (hereinafter defined as mixed solvent (E)) is used in the present invention which comprises at least two organic solvents having a different relative evaporation rate, and the difference between the highest relative evaporation rate and the lowest relative evaporation rate among the two or more solvents is 1.5 or more, preferably 1.7 or more, and more preferably 2.0 or more.

In the case where a single solvent with a high relative evaporation rate is used in place of the mixed solvent (E) of the present invention, the resulting coatings may have impaired appearance such as a wavy striation, streaks, unevenness in coatings, cissing, and the like due to rapid vaporization of the organic solvent after coating; if a solvent with a low relative evaporation rate is used, the organic solvent may remain in the coatings, resulting in coating films with insufficient hardness. The same problems associated with the use of a single solvent may occur even in the case where a mixed solvent comprising two or more types of organic solvents is used, if the difference between the highest relative evaporation rate and the lowest relative evaporation rate of the organic solvents is less than 1.5.

Moreover, it is preferable that the mixed solvent (E) used in the present invention include an organic solvent having a relative evaporation rate of less than 1.5, and more preferably less than 1.0. A moderate solvent evaporation rate for forming coating films without any impaired appearance can be ensured by the use of a mixed solvent containing an organic solvent with a relative evaporation rate of less than 1.5.

Here, the relative evaporation rate is defined as the ratio of the vaporization time for n-butyl acetate and that for a given organic solvent, as shown by the following formula (3), measured at 25° C. in dry air according to ASTM D3539-87.

The relative evaporation rates for various organic solvents are shown in Table 5, in page 17–19 of "Saishin Coating Gidzutu" (Modern Coating Technology 1983, published by Extensive Technologies Service Center Inc.).

Relative evaporation rate=(Time required for 90 wt % of n-butyl acetate to vaporize)/(Time required for 90 wt % of a tested organic solvent to vaporize) (3)

The amount of the mixed solvent (E) incorporated in the resin composition is 5–9900 parts by weight, preferably 20–2000 parts by weight, and more preferably 25–2000 parts by weight, for 100 parts by weight of the total of the composition (the crosslinkable particles (A) and compound (B) and compound (C)). If less than 5 parts by weight, the coated film surface may have impaired appearance; if more than 9900 parts by weight, the coating thickness obtained may be insufficient.

Moreover, it is preferable that the amount of the organic solvent having the highest relative evaporation rate and the amount of the organic solvent having the lowest relative evaporation rate be respectively 10 wt % for 100 wt % of the mixed solvent (E). If the amount of the organic solvent having the highest relative evaporation rate is less than 10 wt %, a long time may be required for the coating to dry; if the amount of the organic solvent having the lowest relative evaporation rate is less than 10 wt %, coatings may have impaired appearance such as coating unevenness, wavy striation, and streaks.

Given as specific examples of the mixed solvent (C) are mixtures of methyl ethyl ketone (relative evaporation rate: 3.7)/isopropanol (same: 1.5), methyl ethyl ketone/toluene (same: 2.0), methyl ethyl ketone/cyclohexanone (same: 0.32), methanol (same: 1.9)/cyclohexanone, methyl isobutyl ketone (same: 1.6)/methanol, methyl ethyl ketone/methanol, methyl ethyl ketone/methyl isobutyl ketone/isopropanol, methyl ethyl ketone/methyl isobutyl ketone/cyclohexanone, methyl ethyl ketone/methyl isobutyl ketone/methanol/isopropanol.

The advantages effects of using resin compositions with mixed solvent (E) also occurs when compound (B) and compound (C) of the present resin composition are replaced by a compound which possesses two or more polymerizable unsaturated groups in the molecule.

6. Additional Components b1, b2, b3

Additional components b1, b2, or b3 may be used in the present invention which will yield after curing products which have excellent hardness and low curling properties.

6.1. Polyfunctional Urethane Compound (b1)

The polyfunctional urethane compound (hereby defined as b1) is used in the present invention to increase scratch resistance and hardness of the cured products. Although there are no specific limitations to the types of polyfunctional urethane compound (b1) inasmuch as the compound has at least two (meth)acryloyl groups, each having a molecular weight of 400 or less, and at least two groups of the formula [—O—C (=O)—NH—] in the molecule, preferable urethane (meth)acrylates are those produced by reacting one mol of the diisocyanate shown by the following formula (3) and two moles of an active hydrogen-containing polymerizable unsaturated compound.

R6—OC(=O)NH—R7—NHCOO—R8 (3)

wherein R6 and R8 are individually an organic group containing a (meth)acryloyl group which is originating from an active hydrogen-containing polymerizable unsaturated compound, and R7 is a divalent organic group originating from a diisocyanate.

Specific examples include a reaction product of 2-hydroxyethyl (meth)acrylate and 2,4-tolylene diisocyanate, a reaction product of 2-hydroxyethyl (meth)acrylate and isophorone diisocyanate, a reaction product of 2-hydroxybutyl (meth)acrylate and 2,4-tolylene diisocyanate, a reaction product of 2-hydroxybutyl (meth)acrylate and isophorone diisocyanate, a reaction product of pentaerythritol tri(meth)acrylate and 2,4-tolylene diisocyanate, a reaction product of pentaerythritol tri(meth)acrylate and isophorone diisocyanate, and the like.

The methods of synthesizing these compounds include a method of feeding both the diisocyanate and the active hydrogen-containing polymerizable unsaturated compound to a reactor and reacting the two compounds; a method of dropping the active hydrogen-containing polymerizable unsaturated compound to the diisocyanate compound to react the two compounds; and a method of feeding an equivalent mol of the active hydrogen-containing polymerizable unsaturated compound and diisocyanate to a reactor, and after the reaction, again feeding the additional the active hydrogen-containing polymerizable unsaturated compound to continue the reaction.

The amount of the polyfunctional urethane compound (b1) used in the composition of the present invention is preferably from 0.01–50 wt %, more preferably from 0.01–40 wt %, for 100 wt % of the composition (the total of (A), (B) and (C)). If less than 0.01 wt %, the scratch resistance of the cured products may be insufficient; if more than 50 wt %, hardness of the cured products may be insufficienct.

6.2. Organofluoro Surfactant (b2)

The organofluoro surfactant (hereby defined as b2) is used in the present invention to increase coatability of the composition to substrates. Unexpectedly, the addition of the organofluoro surfactant (b2) also increases hardness of the cured products. Although either nonionic or anionic organofluoro surfactants can be used without any limitations, nonionic organofluoro surfactants are preferred in view of solubility in solvents. Specifically, products commercially available under the trade names MEGAFAC F-142D, F-144D, F-171, F-172, F-173, F-177, F-178A, F-178K, F-179, F-179A, F-183, F-184, F-191, and F-812 (manufactured by Dainippon Ink and Chemicals, Inc.); EFTOP EF-101, EF-121, EF-122B, EF-122C, EF-122A3, EF-121, EF-123A, EF-123B, EF-126, EF-127, EF-301, EF-302, EF-351, EF-352, EF-601, EF-801, and EF-802 (manufactured by Tohkem Products Co., Ltd.) can be given.

The organofluoro surfactant (b2) is used in the composition of the present invention in an amount preferably from 0.0001–5 wt %, and more preferably from 0.001–3 wt %, for 100 wt % of the composition (the total of (A), (B) and (C)). If less than 0.0001 wt % or more than 5 wt %, hardness of the cured products may be insufficient.

6.3. Thermoplastic Polymer (b3)

The thermoplastic polymer (hereby defined as b3) is used in the present invention to provide low curling properties to cured products (films). Although there are no specific limitations to the types of thermoplastic polymer (b3) as long as the glass transition temperature is 40° C. or more, polymers such as, for example, polystyrene, polymethyl(meth)acrylate, polyamide, polyamideimide, polyester, styrene-butadiene copolymer resin, xylene resin, ketone resin, acrylonitrile-styrene copolymer resin, methyl(meth)acrylate-styrene copolymer resin, norbornene resin, epoxy resin, and the like can be used. Of these, polymethyl(meth)acrylate, methyl(meth)acrylate-styrene copolymer resin are preferred.

The amount of the thermoplastic polymer (b3) used in the present invention is preferably from 1–50 wt %, and more preferably from 2–30 wt %, for 100 wt % of the composition (the total of (A), (B) and (C)). If less than 1 wt %, low curling properties of cured products (films) may be insufficient; of more than 50 wt %, hardness of the cured products may be insufficient. These components (b1), (b2), and (b3) may be used either individually or in combinations of two or more.

7. Other Components

Various components such as photosensitizers, and oxide particles other than the crosslinkable particles (A) can be incorporated in the composition of the present invention as required. Specific examples are given below.

7.1. Photosensitizers

As photosensitizers, for example, triethylamine, diethylamine, N-methyldiethanoleamine, ethanolamine, 4-dimethylaminobenzoic acid, 4-methyldimethylaminobenzoate, 4-ethyldimethylaminobenzoate, 4-isoamyldimethylaminobenzoate, and the like can be given. As commercially available products of photosensitizers, KAYACURE DMBI, EPA (manufactured by Nippon Kayaku Co., Ltd.), and the like can be given.

7.2. Oxide Particles Other than the Crosslinkable Particles (A)

Oxide particles which are not bonded with the specific organic compound, for example, can be given as oxide particles other than the crosslinkable particles (A).

7.3. Various Other Additives

As additives, for example, antioxidants, UV absorbers, light stabilizers, silane coupling agents, aging preventives, thermal polymerization inhibitors, coloring agents, leveling agents, surfactants, preservatives, plasticizers, lubricants, inorganic fillers, organic fillers, wettability improvers, coating surface improvers, and the like can be given.

As commercially available products of antioxidants, Irganox 1010, 1035, 1076, 1222 (manufactured by Ciba Specialty Chemicals Co., Ltd.), and the like can be given; as commercially available products UV absorbers Tinuvin P, 234, 320, 326, 327, 328, 213, 400 (manufactured by Ciba Specialty Chemicals Co., Ltd.), Sumisorb 110, 130, 140, 220, 250, 300, 320, 340, 350, 400 (manufactured by Sumitomo Chemical Industries Co., Ltd.), and the like can be given; as commercially available products of light stabilizers, Tinuvin 292, 144, 622LD (manufactured by Ciba Specialty Chemicals Co., Ltd.), Sanol LS-770, 765, 292, 2626, 1114, 744 (manufactured by Sankyo Chemical Co.), and the like can be given; as silane coupling agents, γ-aminopropyltriethoxysilane, γ-mercaptopropyltrimethoxysilane, γ-methacryloxypropyltrimethoxysilane, and the like can be given; as commercially available products of these silane coupling agents, SH6062, SZ6030 (manufactured by Toray-Dow Corning Silicone Co., Ltd.), KBE903, KBM803 (manufactured by a Shin-Etsu Silicone Co., Ltd.), and the like can be given; and as commercially available products of aging preventives, Antigene W, S, P, 3C, 6C, RD-G, FR, AW (manufactured by Sumitomo Chemical Industries Co., Ltd.), and the like can be given.

7.4. Additives Other than Above-mentioned Additives

Given as additives other than those mentioned above are polymers, oligomers, and the like, for example, epoxy resins, polyamide, polyimide, polyamideimide, plyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resins, xylene resin, ketone resin, fluorine-containing oligomer, silicon-containing oligomer, and polysulfide-type oligomer.

The composition of the present invention is suitable as a coating material. Plastics (polycarbonate, polymethylene acrylate, polystyrene, polyester, polyolefin, epoxy, melamine, triacetyl cellulose, ABS resin, AS resin, norbornene resin, etc.), metals, woods, papers, glass, slates, and the like can be given as examples of the substrates to which the composition is coated. These substrates may be either in the shape of a film or a formed three-dimensional object. Conventional coating methods such as dipping, spray coating, flow coating, shower coating, roll coating, brush coating, and the like can be given as coating methods. The thickness of coating films after cure and drying is usually from 0.1 to 400 μm, and preferably from 1 to 200 μm.

To adjust the coating film thickness, the composition of the present invention can be used by diluting with a solvent. When used as a coating material, for example, the viscosity of the composition is usually from 0.1 to 50,000 mPa·s/25° C., and preferably from 0.5 to 10,000 mPa·s/25° C.

II. Cured Products

The cured products of the present invention can be obtained by applying the composition onto a substrates, for example, and curing the coating. Specifically, such a cured product can be obtained as a coated form by applying the composition onto an object, drying the coating by removing volatile components at a temperature preferably from 0 to 200° C., and curing the coating by heat and/or radioactive rays. Curing by heat is preferably performed under the conditions from 20 to 150° C. for 10 seconds to 24 hours. When the coating is cured by radioactive rays, use of ultraviolet rays and electron beams are preferable. Ultraviolet rays are irradiated at a dose preferably from 0.01–10 J/cm², and more preferably from 0.1 to 2 J/cm². Electron beams are irradiated under the conditions of 10–300 KV, an electron density of 0.02–0.30 mA/cm², and at a dose from 1–10 Mrad.

Because the cured products of the present invention exhibit high hardness, superior scratch resistance, low curling properties, excellent adhesion, transparency, and coating film appearance, particularly outstanding coating film appearance, the products can be used as a protective coating material to prevent stains or scratches on plastic optical parts, touch panels, film-type liquid crystal elements, plastic containers, or flooring materials, wall materials, and artificial marbles which are used for architectural interior finishes, (particularly as a hard coating material for plastic sheets and plastic films requiring transparency); as an adhesive for various substrates, a sealing material, and a vehicle for printing ink; and the like.

III. Composite Material Comprising Norbornene Type Resins

A composite material which comprises norbornene type resins is prepared by coating the above resin composition onto the surface of an article prepared from a norbornene type resin and curing the coating. Because the resin composition exhibits outstanding adhesion to various articles (substrates) when cured, the composition can produce coatings with excellent adhesion on the surface of articles formed from resins containing a (co)polymer having an alicyclic structure as a major component (10 wt % or more), particularly norbornene-type resins, for which it has been very difficult to provide protective coatings using conventional coating materials. This has made it possible to produce a composite material with a hard coating which is transparent and difficult to detach.

Additional surface treatment such as paint coating, plating, physical vapor deposition, chemical vapor deposition, and plasma processing can be provided on the composite material coated with the composition of the present invention to provide the composite material with addition properties such as anti-reflection properties, anti-static properties, anti-pollution properties, dew-proofing properties, water repellency, oil repellency, electromagnetic shielding properties, ultraviolet ray shielding properties, heat wave absorptivity, conductivity, insulation properties, flame retardant properties, anti-microbial properties, etc.

The same methods and conditions as used for producing the cured products from the composition of the present invention can be applied to coating and curing operations on the surface of the above various articles.

As examples of norbornene-type resins used in the present invention, resins comprising (co)polymers having an alicyclic structure shown by the following formula (3), (4), (5), or (6) as major components (10 wt % or more) can be given:

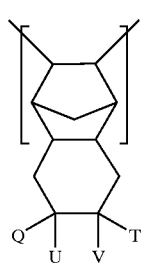

(4)

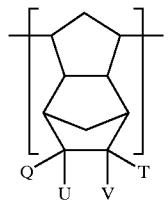

(5)

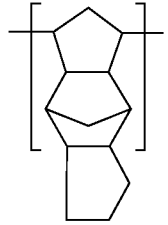

(6)

wherein, Q, U, V, and T individually represent a hydrogen atom, a hydrocarbon group having 1–10 carbon atoms, halogen atom, halogen-substituted hydrocarbon group having 1–10 carbon atoms, —$(CH_2)_n COOR^6$, —$(CH_2)_n COR^6$, —$(CH_2)_n R^6$, —$(CH)_n CN$, —$(CH_2)_n CONR^7 R^8$, —$(CH_2)_n COOZ$, —$(CH_2)_n OCOZ$, —$(CH_2)_n OZ$, or —$(CH_2)_n W$, or a cyclic alkylene group formed from U and V which is shown by the following formula:

7 wherein $R^6$, $R^7$, $R^8$, and $R^9$ individually represent a hydrocarbon group having 1–20 carbon atoms, Z is a halogen-substituted hydrocarbon group, W represents $SiR^{10}_p F_{3-p}$ (wherein $R^{10}$ represents a hydrocarbon group having 1–10 carbon atoms, F is a halogen atom, —$OCOR^{11}$ or —$OR^{11}$ (wherein $R^{11}$ is a hydrocarbon group having 1–10 carbon atoms), and p denotes an integer from 0–3), and n denotes an integer from 0–10.

As specific examples of the norbornene-type resins used in the present invention, the resins described in Japanese Patent Applications Laid-open No. 168708/1985, No. 252406/1987, No. 252407/1987, No. 133413/1990, No. 145324/1988, No. 264626/1988, No. 240517/1989, and Japanese Patent Publication No. 8815/1982 can be given. Among these, norbornene-type (co)polymers obtained by the ring-opening polymerization of norbornene-type monomers shown by the following formula (8) or norbornene-type hydrogenated (co)polymers obtained by the hydrogenation of such (co)polymers are desirable:

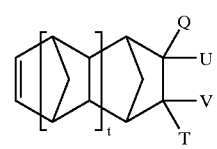

(8)

wherein Q, U, V, and T are the same as defined for said formulas (3) to (6), and t is 0 or 1.

In addition, copolymers prepepared from two or more types of monomers which are shown by above formula (8) can be used as the norbornene-type polymers.

As the monomers copolymerizable with the monomers shown by the above-mentioned formula (8), cycloalkenes such as cyclopentene, cyclohexene, cycloheptene, cyclooctene, and pentacyclopentadecene, or alkyl-substituted products of these cycloalkenes can be given. In this instance, the proportion of the monomers shown by the above formula (8) is preferably 50 mol % or more, more preferably 70 mol % or more, and particularly preferably 80 mol % or more.

Because the composite material of the present invention is provided with a hard coat which is transparent and difficult to be detached, the composite material can be widely used as anti-reflective sheets, anti-reflective films, antistatic sheets, antistatic films, ultraviolet ray shielding sheets, ultraviolet ray shielding films, heat wave reflection sheets, heat wave reflection films, conductive sheets, conductive films, touch panels, cathode-ray tubes, front panels and input part materials of various displays such as laser displays, photochromic displays, electrochromic displays, liquid crystal displays, plasma displays, light emitting diode displays, and electroluminescent panels; front covers for cover cases, etc., optical lenses, spectacle lenses, wind shields, light covers, helmet shields, and the like.

EXAMPLES

The present invention will now be described in detail by way of examples, which should not be construed as limiting the present invention.

In the description below, "parts" and "%" respectively mean "parts by weight" and "wt %", unless otherwise indicated.

The words "solid content" mean the content excluding volatile content such as solvents from the composition in the present invention, specifically, "solid content" mean a residue (nonvolatile content) obtained by drying the composition for one hour on a hot plate at 120° C.

Synthetic Example 1

20.6 parts of isophorone diisocyanate was added dropwise to a solution of 7.8 parts of mercaptopropyltrimethoxysilane and 0.2 part of dibutyltin dilaurate in dry air in one hour while stirring at 50° C. The mixture was stirred for a further three hours at 60° C. After the addition of 71.4 parts of pentaerythritol triacylate dropwise in one hour at 30° C., the mixture was stirred for a further three hours at 60° C. with heating to obtain a specific organic compound (S1). An infrared absorption spectrum of the product showed that the absorption peaks at 2550 cm$^{-1}$ characteristic to a mercapto group and at 2260 cm$^{-1}$ characteristic to an isocyanate group in the raw material disappeared, and the absorption peaks at 1660 cm$^{-1}$ characteristic to a carbonyl group in the groups [—O—C(=O)—NH—] and [—S—C(=O)—NH—] and at 1720 cm$^{-1}$ characteristic to an acryloyl group were observed, indicating production of the specific organic compound having an acryloyl group as a polymerizable unsaturated groups, [—O—C(=O)—NH—] group, and [—S—C(=O)—NH—] group.

Synthetic Example 2

38.7 parts of 1,3-bis(isocyanatemethyl)-cyclohexane was added dropwise to a solution of 38.4 parts of mercaptopropyltrimethoxysilane and 0.2 part of dibutyltin dilaurate in dry air in one hour while stirring at 50° C. The mixture was stirred for a further three hours at 70° C. After the addition of 22.7 parts of 2-hydroxyethyl acrylate dropwise in one hour at 30° C., the mixture was stirred for a further ten hours at 60° C. with heating to obtain the specific organic compound (S2). The amount of isocyanate remaining in the product was analyzed to find that the remaining amount was 0.1% or less, indicating that the reaction was completed almost quantitatively.

Examples for preparing crosslinkable particles (A) are shown in Preparation Examples 1 to 6. The results are summarized in Table 1.

Preparation Example 1

A mixture of 8.7 parts of the specific organic compound (S1), 91.3 parts of methyl ethyl ketone silica sol (MEK-ST, manufactured by Nissan Chemical Industries, Ltd., number average particle diameter: 0.022 μm, silica content: 30%), 0.2 part of isopropanol, and 0.1 part of ion-exchanged water was stirred at 80° C. for 3 hours in a nitrogen gas stream, followed by the addition of 1.4 parts of methyl orthoformate. The mixture was stirred for a further one hour while heating at the same temperature, to obtain a colorless transparent dispersion liquid of crosslinkable particles (A) (Dispersion Liquid "a"). 2 g of Dispersion Liquid "a" was weighed on an aluminum dish and dried for one hour over a hot plate at 120° C. The dried material was weighed to indicate that the solid content was 35%.

Preparation Example 2

A mixture of 80 parts of the organic compound (S1), 20 parts of silica powder particles (AEROSIL TT600, manufactured by Japan Aerosil Co. Ltd., the number average particle diameter: 0.04 μm), 5 parts of isopropanol, 180 parts of ethyl acetate, and 7 parts of ion-exchanged water was stirred at 80° C. for 3 hours in a nitrogen gas stream, followed by the addition of 41 parts of methyl orthoformate. The mixture was stirred for a further one hour while heating at the same temperature to obtain a semitransparent dispersion liquid of crosslinkable particles (A) (Dispersion Liquid "b"). The solid content of the Dispersion Liquid "b" was measured in the same manner as in Preparation Example 1 to indicate that the content was 30%.

Preparation Example 3

A mixture of 8.3 parts of the organic compound (S2), 91.7 parts of the methyl ethyl ketone silica sol (MEK-ST), and 0.8 parts of ion-exchanged water was stirred at 80° C. for 3 hours in a nitrogen gas stream, followed by the addition of 4.9 parts of methyl orthoformate. The mixture was stirred for a further one hour while heating at the same temperature (80° C.) to obtain a semitransparent dispersion liquid of crosslinkable particles (A) (Dispersion Liquid "c"). The solid content of the Dispersion Liquid "c" was measured in the same manner as in Preparation Example 1 to indicate that the content was 34%.

Preparation Example 4

A mixture of 92.5 parts of a methanol alumina sol (the number average particle diameter: 0.0075 μm, alumina content, 30%, water content: 5.6%) prepared by solvent replacement of an aqueous alumina sol (manufactured by CI Kasei Co., Ltd.), 7.5 parts of the organic compound (S2), and 0.01 part of p-methoxyphenol was stirred at 60° C. for 3 hours, followed by the addition of 1.3 parts of methyl orthoformate and 41.2 parts of methanol. The mixture was stirred for a further one hour while heating at the same temperature to obtain a dispersion liquid of crosslinkable particles (A) (Dispersion Liquid "d"). The solid content of the Dispersion Liquid "d" was measured in the same manner as in Preparation Example 1 to indicate that the content was 25%.

Preparation Example 5

A mixture of 8.2 parts of the organic compound (S1), 91.8 parts of a toluene zirconium oxide sol (the number average particle diameter: 0.05 μm, zirconium oxide concentration: 30%), and 0.1 part of ion-exchanged water was stirred at 60° C. for 3 hours, followed by the addition of 1.3 parts of methyl orthoformate and 41.2 parts methyl ethyl ketone. The mixture was stirred for a further one hour while heating at the same temperature to obtain a dispersion liquid of crosslinkable particles (A) (Dispersion Liquid "e"). The solid content of the Dispersion Liquid "e" was measured in the same manner as in Preparation Example 1 to indicate that the content was 25%.

Preparation Example 6

A mixture of 8.2 parts of the organic compound (S2), 91.8 parts of a methyl ethyl ketone antimony oxide sol (AME-130 manufactured by Nissan Chemical Industries, Ltd., the number average particle diameter: 0.05 μm, antimony pentaoxide concentration: 30%), and 0.1 part of ion-exchanged water was stirred at 60° C. for 3 hours, followed by the addition of 1.3 parts of methyl orthoformate and 41.2 parts methyl ethyl ketone. The mixture was stirred for a further one hour while heating at the same temperature to obtain a dispersion liquid of crosslinkable particles (A) (Dispersion Liquid "f"). The solid content of the Dispersion Liquid "f" was measured in the same manner as in Preparation Example 1 to indicate that the content was 25%.

TABLE 1

|  | \multicolumn{6}{c}{Preparation example} |
|---|---|---|---|---|---|---|
|  | prep. 1 | prep. 2 | prep. 3 | prep. 4 | prep. 5 | prep. 6 |
| Dispersion liquid of crosslinking particles (A) | a | b | c | d | e | f |
| Organic compound |  |  |  |  |  |  |
| S1 | 8.7 | 80 |  |  | 8.2 |  |
| S2 |  |  | 8.3 | 7.5 |  | 8.2 |
| Oxide particles or sol* |  |  |  |  |  |  |
| P1 | 91.3 |  | 91.7 |  |  |  |
| P2 |  | 20 |  |  |  |  |
| P3 |  |  |  | 92.5 |  |  |
| P4 |  |  |  |  | 91.8 |  |
| P5 |  |  |  |  |  | 91.8 |
| Ion-exchanged water | 0.1 | 7 | 0.8 |  | 0.1 | 0.1 |
| Isopropanol | 0.2 | 5 |  |  |  |  |
| Ethyl acetate |  | 180 |  |  |  |  |
| Methanol |  |  |  | 41.2 |  |  |
| Methyl ethyl ketone |  |  |  |  | 41.2 | 41.2 |
| Methyl orthoformate | 1.4 | 41 | 4.9 | 1.3 | 1.3 | 1.3 |
| p-Methoxyphenol |  |  |  | 0.01 |  |  |
| Solid content (%) | 35 | 30 | 34 | 25 | 25 | 25 |
| Rate of oxide particles in raw material (%) | 76 | 20 | 77 | 79 | 77 | 77 |

Note: All oxide concentrations other than P2 (Silica Powder) are 30%
P1: Methyl ethyl ketone silica sol
P2: Silica powder
P3: Methanol alumina sol
P4: Toluene zirconium oxide sol
P5: Methyl ethyl ketone antimony oxide sol Analysis of Crosslinkable Particles (A)

The amount of the organic compound bonded with the crosslinkable particles (A) was measured by the following method.

Analytical Examples 1

100 parts of the dispersion liquid of crosslinkable particles (A) prepared in Preparation Example 3 (Dispersion Liquid "c") was subjected to a ultra-centrifuge at 30,000 rpm for 5 hours to cause silica components to precipitate. The precipitate was removed from the organic layer by decantation, dispersed into 100 parts methyl ethyl ketone, and ultra-centrifuged again under the same conditions to separate the crosslinkable particles (A). The resulting crosslinkable particles (A) were dried at room temperature for one hour, then treated with heat for 12 hours at 40° C. under 0.1 mm Hg. The dry powder was mixed with KBr powder to measure the IR absorption spectrum. The IR spectrum is shown in FIG. 1.

In FIG. 1, in addition to the peaks at 805 cm−1, 1000 to 1300 cm$^{-1}$, 1637 cm$^{-1}$, and 3000–3700 cm$^{-1}$ originating from silica, the peak at 1724 cm$^{-1}$ of $v_{c=o}$ absorption by acryloyl group and the peak at 1654 cm$^{-1}$ of $v_{c=o}$ absorption by [—O—C(=O)—NH—] group and [—S—C(=O)—NH—] group can be observed, indicating that the organic compound (S2) bonds to silica particles. The weight reduction of crosslinkable particles (A) from the constant weight at 110° C. when the particles were heated to 800° C. in air, specifically the weight reduction due to combustible organic materials, was determined by thermogravimetric analysis (TGA) to indicate that the weight reduction was 20%. The corresponding weight reduction determined under the same conditions using the powder isolated from an untreated methyl ethyl ketone silica sol was 3%. From the difference between these values, it can be concluded that the amount of the organic compound (S2) bonded to silica particles is at least 17% or more. From the results of the above experiment, it can be seen that the organic compound raw material used in the present invention bonds to oxide particles.

Preparation Example 12

A mixture of 4.8 parts of the specific organic compound (S1), 95.2 parts of isopropanol alumina sol (trade name: AS-150I, the number on average particle diameter: 0.013 μm, alumina concentration: 1.5%, manufactured by Sumitomo Osaka Cement Co., Ltd.), 0.01 part of p-methoxy phenol, and 1.0 part of ion-exchanged water was stirred for 3 hours at 60° C. After the addition of 1.0 part of methyl orthoformate, the mixture was stirred for a further one hour to obtain a dispersion liquid of crosslinkable particles (A) (Dispersion Liquid "c"). The solid content of Dispersion Liquid "c" was measured in the same manner as in Preparation Example 1 to indicate that the solid content was 19%.

Examples for the Preparation of Compositions

Examples for the preparation of the composition of the present invention are shown in Examples C1–C9 and Comparative Examples C1–C3. The recipes for the compositions are shown in Table 2.

Example 1

70 parts of Dispersion Liquid "a" prepared in the Preparation Example 1, 20 parts of dipentaerythritol hexacrylate, 10 parts of trimethylolpropane triacrylate, 1.5 parts of 1-hydroxycyclohexyl phenyl ketone, and 1.5 parts of 2-methyl-1-(4-(methylthio)phenyl)-2-morpholinopropanone-1 were mixed by stirring for 30 minutes in a dry air stream in a container shielded from ultraviolet rays at room temperature, to obtain a composition in the form of a homogeneous solution.

The compositions for Examples 2–9 and Comparative Examples 1–3 shown in Table 2 were prepared in the same manner as above.

TABLE 2

| | Example | | | | | | | | | Comparative Example | | |
|---|---|---|---|---|---|---|---|---|---|---|---|---|
| | C1 | C2 | C3 | C4 | C5 | C6 | C7 | C8 | C9 | C1 | C2 | C3 |
| Dispersion liquid of crosslinkable particles (A) | | | | | | | | | | | | |
| a | 70 | | | 70 | 70 | 70 | | | | | 70 | 70 |
| b | | 70 | | | | | | | | | | |
| c | | | 70 | | | | | | | | | |
| d | | | | | | | 70 | | | | | |
| e | | | | | | | | 70 | | | | |
| f | | | | | | | | | 70 | | | |
| Dispersion liquid of particles | | | | | | | | | | | | |
| P1 | | | | | | | | | | 70 | | |
| Compound possessing 4 or more polymerizable unsaturated groups | | | | | | | | | | | | |
| M1 | 20 | | 10 | 15 | 15 | 15 | 15 | 20 | 20 | 20 | | 20 |
| M2 | | 15 | | | | | | | | | | |
| M3 | | | 5 | | | | | | | | | 10 |
| Compound possessing 1–3 polymerizable unsaturated groups | | | | | | | | | | | | |
| N1 | 10 | | 15 | | | | | 10 | | 10 | 20 | |
| N2 | | 15 | | | | | 15 | | | | | |
| N3 | | | | 15 | 15 | 15 | | | | | | |
| N4 | | | | | | | | | 10 | | 10 | |
| Radioactive polymerization initiator | | | | | | | | | | | | |
| R1 | 1.5 | 1.5 | 1.5 | 1.5 | 3 | | 1.5 | 1.5 | 1.5 | 1.5 | 1.5 | 1.5 |
| R2 | 1.5 | 1.5 | 1.5 | 1.5 | | 3 | 1.5 | 1.5 | 1.5 | 1.5 | 1.5 | 1.5 |
| Total | 103 | 103 | 103 | 103 | 103 | 103 | 103 | 103 | 103 | 103 | 103 | 103 |
| Content of nonvolatile component (%) | 56 | 52 | 55 | 56 | 56 | 56 | 49 | 49 | 49 | 52 | 56 | 56 |

P1: Methyl ethyl ketone silica sol
M1: Dipentaerythritol hexaacrylate
M2: Dipentaerythritol pentacrylate
M3: Pentaerythritol tetraacrylate
N1: Trimethylolpropane triacrylate
N2: Pentaerythritol triacrylate
N3: Tris(2-hydroxyethyl)isocyanurate triacrylate
N4: 1,6-Hexanediol diacrylate
R1: 1-Hdroxycyclohexyl phenyl ketone
R2: 2-Methyl-1-[4-(methylthio)phenyl]-2-morpholinopropanone-1

P1: Methyl ethyl ketone silica sol
M1: Dipentaerythritol hexaacrylate
M2: Dipentaerythritol pentacrylate
M3: Pentaerythritol tetraacrylate
N1: Trimethylolpropane triacrylate
N2: Pentaerythritol triacrylate
N3: Tris(2-hydroxyethyl)isocyanurate triacrylate
N4: 1,6-Hexanediol diacrylate
R1: 1-Hdroxycyclohexyl phenyl ketone
R2: 2-Methyl-1-[4-(methylthio)phenyl]-2-morpholinopropanone-1

Evaluation of Cured Products

To demonstrate the effects of the composition of the present invention, the cured products obtained from the above-mentioned compositions by coating, drying, and exposure to radiation were evaluated. The evaluation methods used were as follows. The results of the evaluation are shown in Table 3.

1. Conditions of Coating, Drying, and Curing

The compositions of Examples 1–9 and Comparative Examples 1–3 of Table 3 were applied to substrates using a bar coater so as to produce dry films with a thickness of 10 μm, dried in a hot blast oven at 80° C. for 3 minutes, irradiated at a dose of 1 J/cm2 using a conveyer-type mercury lamp, and stored at 25° C. for 24 hours before the evaluation.

2. Substrates

Glass plates were used for the pencil hardness test and the evaluation of transparency (measurement of light transmittance), and polyethylene terephthalate (PET) films with a thickness of 188 μm were used for the steel wool scratch resistance test, the evaluation of adhesion and curling properties.

3. Evaluation Method

Coating Film Appearance

Presence of foreign matter and abnormalities such as coating unevenness, repellency, whiteness, etc. were judged by naked eye observation. The case where no foreign matter and abnormalities were found was rated as ○, whereas the case where at least one type of foreign matter or abnormalities were found was rated as X.

Light Transmittance (%)

For the evaluation of transparency, the light transmittance at a wavelength of 500 nm was measured using spectrophotometer. The measured values are those after correction of transmittance of the substrate.

Pencil Hardness

Cured coatings on glass substrates were evaluated according to JIS K5400.

Adhesion (%)

The number of remaining 1 mm×1 mm squares among 100 squares in the cellophane tape cross-cut peeling test according to JIS K5400 was counted to evaluate the adhesion.

Steel Wool (SW) Scratch Resistance

A Gakushin type abrasion tester manufactured by Tester Industry Co., Ltd. was reciprocated 30 times using #0000 steel wool with a load of 500 g to evaluated scratches of the coating film surface by naked eye observation. The case where no scratch was found was rated as ◯, where there were 1–10 scratches was rated as Δ, and where more than 10 scratches was found was rated as X.

Curling (mm)

Coatings was prepared on a PET film with a thickness of 188 μm using the composition of the present invention according to the same application and cure conditions as mentioned above, immediately followed by cutting of 10 cm×10 cm sheets with a cutter knife. The sheets were left at 25° C. and RH 50% for 24 hours to measure the warping mean value (mm) of the four corners.

aluminum dish and dried for one hour over a hot plate at 120° C. The dried material was weighed to indicate that the solid content was 35%.

Preparative Example 8

A mixture of 89.7 parts of a methanol alumina sol (the number average particle diameter: 0.0075 mm, alumina concentration: 30%, water content: 5.6%) prepared by solvent replacement of an aqueous alumina sol (manufactured by CI Chemical Co., Ltd.) (solid components: 26.9 parts), 7.3 parts of the compound (S2) prepared in Synthetic Example 2, and 0.01 part of p-methoxyphenol was stirred at 60° C. for 3 hours. Three parts of methyltriethoxysilane was added to the reaction mixture as the compound ($A_3$), followed by stirring for one hour at 60° C. Then, 9 parts of methyl orthoformate were added and the mixture was stirred for one hour while heating at the same temperature, to obtain a crosslinkable particles dispersion liquid (Dispersion Liquid P8). The solid content of this dispersion liquid was measured in the same manner as in Example 1, to indicate that the solid content was 25%.

Preparative Example 9

A mixture of 90.4 parts of a methanol silica sol (a methanol solvent colloidal silica dispersion liquid (the num-

TABLE 3

| | Example | | | | | | | | | Comparative Example | | |
|---|---|---|---|---|---|---|---|---|---|---|---|---|
| | C1 | C2 | C3 | C4 | C5 | C6 | C7 | C8 | C9 | C1 | C2 | C3 |
| Coating film appearance | ◯ | ◯ | ◯ | ◯ | ◯ | ◯ | ◯ | ◯ | ◯ | X | ◯ | ◯ |
| Light transmittance (%) | 95 | 94 | 95 | 95 | 95 | 95 | 94 | 95 | 94 | 81 | 95 | 95 |
| Pencil hardness | 8H | 6H | 8H | 8H | 7H | 6H | 8H | 8H | 8H | 5H | 3H | 8H |
| Adhesion (%) | 100 | 100 | 100 | 100 | 100 | 100 | 100 | 100 | 100 | 100 | 100 | 100 |
| Steel wool (SW) scratch resistance | ◯ | ◯ | ◯ | ◯ | ◯ | ◯ | ◯ | ◯ | ◯ | X | Δ | ◯ |
| Curling (mm) | 3 | 3 | 3 | 1 | 1 | 1 | 3 | 3 | 2 | 8 | 5 | 19 |

The following examples show the unexpected advantageous effects of adding compound ($A_3$) during preparation of crosslinkable particles (A).

Preparation of Crosslinkable Particles

The crosslinkable particles of the present invention were prepared according to the formulations and under the conditions shown in Table 4 (preparative examples 7–11). The Table 4 also shows the evaluation results of the crosslinkable particles.

Preparative Example 7

A mixture of 88.5 parts of a methanol silica sol (a methanol solvent colloidal silica dispersion liquid (the number average particles diameter: 0.012 mm, silica concentration: 30%) manufactured by Nissan Chemical Industries, Ltd.) (solid components: 26.6 parts), 8.5 parts of the compound (S1) prepared in Synthetic Example 1, and 0.01 part of p-methoxyphenol was stirred for 4 hours in a nitrogen gas stream at 60° C. Three parts of methyltrimethoxysilane was added to the reaction mixture as the compound ($A_3$), followed by stirring for one hour at 60° C. Then, 9 parts of methyl orthoformate were added and the mixture was stirred for one hour while heating at the same temperature, to obtain a crosslinkable particles dispersion liquid (Dispersion Liquid P7). 2 g of the dispersion liquid was weighed on an ber average particles diameter: 0.012 mm, silica concentration: 30%) manufactured by Nissan Chemical Industries, Ltd.) (solid components:27.1 parts), 8.6 parts of the compound (S1), and 0.01 part of p-methoxyphenol was stirred for 4 hours in a nitrogen gas stream at 60° C. 9 parts of methyltrimethoxysilane was added to the reaction mixture as the compound ($A_3$), followed by stirring for one hour at 60° C. Then, 9 parts of methyl orthoformate was added and the mixture was stirred for one hour while heating at the same temperature, to obtain a crosslinkable particles dispersion liquid (Dispersion Liquid P9). The solid content of the dispersion liquid was 34%.

Preparative Example 10

A mixture of 90.4 parts of a methanol silica sol (a methanol solvent colloidal silica dispersion liquid (the number average particles diameter: 0.012 mm, silica concentration: 30%) manufactured by Nissan Chemical Industries, Ltd.) (solid components: 27.1 parts) and one part of methyltrimethoxysilane as the compound ($A_3$) was stirred for one hour in a nitrogen gas stream at 60° C. 8.6 parts of the compound (S1) and 0.01 part of p-methoxyphenol as the compound ($A_3$) were added to the reaction mixture, followed by stirring for four hours at 60° C. Then, 9 parts of methyl orthoformate was added and the mixture was stirred for one hour while heating at the same temperature, to obtain a crosslinkable particles dispersion liquid (Dispersion Liquid P10). The solid content of the dispersion liquid was 34%.

Preparative Example 11

Preparative example 7 has been repeated except that no compound ($A_3$) has been added. A dispersion P11 has been obtained, which shows a remarkable lower storage stability compared to dispersions P7–P10.

Example C11

A composition (Composition Q2) was prepared in the same manner as in Example C10, except for using Dispersion Liquid P8 instead of Dispersion Liquid P7.

TABLE 4

|  | Prep. example 7 | Prep. example 8 | Prep. example 9 | Prep. example 10 | Prep. Example 11 |
|---|---|---|---|---|---|
| Dispersion liquid of crosslinkable particle | P7 | P8 | P9 | P10 | P11 |
| Dispersion liquid of oxide particle (A) |  |  |  |  |  |
| Methanol silica sol | 88.5 (26.6)* |  | 90.4 (27.1)* | 90.4 (27.1)* | 88.5 (26.6)* |
| Methanol alumina sol |  | 89.7 (26.9)* |  |  |  |
| Compound $A_2$ |  |  |  |  |  |
| S1 | 8.5 |  | 8.6 | 8.6 | 8.5 |
| S2 |  | 7.3 |  |  |  |
| Compound $A_3$ |  |  |  |  |  |
| Methyltrimethoxysilane | 3 |  | 1 | 1 |  |
| Ethyltrimethoxysilane |  | 3 |  |  |  |
| p-methoxyphenol | 0.01 | 0.01 | 0.01 | 0.01 | 0.01 |
| Methyl orthoformate | 9 | 9 | 9 | 9 | 9 |
| Methanol |  | 37 |  |  |  |
| Total | 109.01 | 146.01 | 109.01 | 109.01 | 106.01 |
| Solid content (%) | 35 | 25 | 34 | 34 | 33 |
| Addition order of ($A_2$) and ($A_3$) | ($A_2$) was first | ($A_2$) was first | At the same time | ($A_3$) was first | ($A_3$) was not added |
| Dispersion stability | ○ | ○ | ○ | ○ | ○ |
| Storage stability 23° C. |  |  |  |  |  |
| 10 days | ○ | ○ | ○ | ○ | ○ |
| 30 days | ○ | ○ | ○ | ○ | Viscosity increased |
| 90 days | ○ | ○ | ○ | ○ | Gelled |
| Storage stability 40° C. |  |  |  |  |  |
| 10 days | ○ | ○ | ○ | ○ | Viscosity increased |
| 30 days | ○ | ○ | ○ | ○ | Gelled |
| 90 days | ○ | ○ | Viscosity increased | Viscosity increased |  |

*The parenthesized number indicate the contents of solid component.

Preparation of Compositions

Compositions using the dispersion liquids of crosslinkable particles were prepared in the above-described Examples (Examples C10–C11). The weight ratio of the components for the compositions are shown in Table 5. Table 5 also shows the results of evaluation of the compositions.

Example C10

70 parts of the dispersion liquid of crosslinkable particles (Dispersion Liquid P7, solid components: 21 parts) prepared in preparative example 7, 30 parts of dipentaerythritol hexaacrylate, 1.5 parts of 1-hydroxycyclohexyl phenyl ketone, and 1.5 parts of 2-methyl-1-[4-(methylthio)phenyl]-2-morpholinopropanone-1 were blended by stirring for 30 minutes in a dry air stream in a container shielded from ultraviolet rays at room temperature, to obtain a composition (Composition Q).

TABLE 5

| Composition | Example C10 Q1 | Example C11 Q2 |
|---|---|---|
| Dispersion liquid of crosslinkable particle (A) |  |  |
| P7 | 70 (21)* |  |
| P8 |  | 70 (21)* |
| Compound possessing 2 or more polymerizable unsaturated groups |  |  |
| Dipentaerythritol hexaacrylate | 30 | 30 |
| Radiation polymerization initiator |  |  |
| 1-hydroxycyclohexyl phenyl ketone | 1.5 | 1.5 |
| 2-methyl-1-[4-(methylthio)phenyl-2-morpholinopropanone-1 | 1.5 | 1.5 |
| Total | 103 | 103 |

TABLE 5-continued

| Composition | Example C10 Q1 | Example C11 Q2 |
|---|---|---|
| Content of nonvolatile component (%) | 57 | 50 |
| Storage stability 23° C. | | |
| 10 days | ○ | ○ |
| 30 days | ○ | ○ |
| 90 days | ○ | ○ |
| Storage stability 40° C. | | |
| 10 days | ○ | ○ |
| 30 days | ○ | ○ |
| 90 days | ○ | ○ |
| Coating appearance | ○ | ○ |
| Pencil hardness | 8H | 8H |
| Adhesion | 100 | 100 |
| Steel wool (SW) scratch resistance | ○ | ○ |
| Curling | 3 | 3 |

*The parenthesized numbers indicate the contents of solid component.

Evaluation of Crosslinkable Particles

Dispersion stability and storage stability were evaluated using Dispersion Liquids P7, P8, P9, P10 and P11 prepared in preparative examples 7–11 for the preparation of crosslinkable particles. The following methods of evaluation were used. The results of the evaluation are shown in Table 4.

Dispersion Stability

Appearance of dispersion liquids was observed to evaluate presence or absence of deposited particles and/or precipitates. Samples with neither deposited particles nor precipitates were rated as ○, otherwise the samples were rated as X.

Storage Stability

Glass bottles shielded from UV filled with 100 g of a dispersion liquid were sealed and allowed to stand at 23° C. or 40° C. for 10, 30, and 90 days to evaluate a viscosity increase and gel formation by observation of appearance. Samples with neither the viscosity increase nor gel formation occurring were rated as ○.

Evaluation of Compositions

Storage stability was evaluated on the compositions Q1 and Q2 prepared in Examples C10 and C11. Also were evaluated appearance, transparency, pencil hardness, adhesion, steel wool (SW) scratch resistance, and curling properties using cured coatings prepared by applying the compositions, and drying and curing the coatings by irradiation. The results are shown in Table 5.

The evaluation methods used were as follows.

Appearance and Transparency of Coatings

The composition was applied onto a polyethylene terephthalate (PET) film with a thickness of 188 mm using a bar coater to produce coating with a dry thickness of 10 mm. The coating was dried in a hot wind oven at 80° C. and irradiated with light at a dose of 1 J/cm2 using a conveyer-type mercury lamp. Appearance and transparency of the resulting coating film were observed to evaluate the presence or absence of unusual matters and abnormalities such as coating unevenness, repellency, whiteness, etc. The samples in which no such abnormalities were found were rated as ○, otherwise the samples were rated as X.

TABLE 6

| | Preparation Example | | | |
|---|---|---|---|---|
| | prep. 1 | prep. 3 | prep. 12 | prep. 5 |
| Dispersion liquid of crosslinkable particles (A) | a | c | g | e |
| Specific organic compound | | | | |
| S1 | 8.7 | | 4.8 | 8.2 |
| S2 | | 8.3 | | |
| Oxide particle sol | | | | |
| P1 | 91.3 | 91.7 | | |
| P2 | | | 95.2 | |
| P3 | | | | 91.8 |
| Ion-exchanged water | 0.1 | 0.8 | 0.1 | 0.1 |
| Isopropanol | 0.2 | | | |
| Methyl ethyl ketone | | | | 41.2 |
| Methyl orthoformate | 1.4 | 4.9 | 1.0 | 1.3 |
| p-Methoxy phenol | | | 0.01 | |
| Solid content (%) | 35 | 34 | 19 | 25 |
| Proportion of oxide particles in the raw materials (%) | 76 | 77 | 72 | 77 |

P1: Methyl ethyl ketone silica sol (Oxide concentration: 30%)
P2: Isopropanol alumina sol (Oxide concentration: 15%)
P3: Toluene zirconium oxide sol (Oxide concentration: 30%)

The following examples show the unexpected advantageous effects of the use of mixed solvent (E).

Preparative Example 12

A mixture of 4.8 parts of the specific organic compound (S1), 95.2 parts of isopropanol alumina sol (trade name: AS-150I, the number on average particle diameter: 0.013 μm, alumina concentration: 1.5%, manufactured by Sumitomo Osaka Cement Co., Ltd.), 0.01 part of p-methoxy phenol, and 1.0 part of ion-exchanged water was stirred for 3 hours at 60° C. After the addition of 1.0 part of methyl othoformate, the mixture was stirred for a further one hour to obtain a dispersion liquid of crosslinkable particles (A) (Dispersion Liquid "g"). The solid content of Dispersion Liquid "g" was measured in the same manner as in Preparation Example 1 to indicate that the solid cotent was 19%.

Examples for the Preparation of Compositions

Examples for the preparation of compositions comprising mixed solvent (E) are shown in Examples C12–C18. The weight ratio of the components for the compositions are shown in Table 7.

Example C12

151 parts of Dispersion Liquid "a" (the crosslinkable particles (A): 53 parts, dispersion medium: methyl ethyl ketone (MEK)), 23.5 parts of dipentaerythritol hexacrylate, and 23.5 parts of pentaerythritol tetracrylate were mixed in a 500 cc flask. The mixture was concentrated using a rotary evaporator under vacuum to a volume of 131 parts. 122 parts of methyl isobutyl ketone (MIBK), 0.9 parts of 1-hydroxycyclohexyl phenyl ketone, and 0.9 parts of 2-methyl-1-(4-(methylthio)phenyl)-2-morpholinopropanone-1 were added, and the mixture was stirred for two hours at 50 to obtain a composition in the form of a homogeneous solution. The preparation was carried out in a room shielded from ultraviolet rays. The solid content of the composition was determined in the same manner as in Preparation Example 1, to find that the solid content was 40%.

Example C13

A composition was prepared in the same manner as in Example C12 except for using the components shown in Table 7.

Example C14

151 parts of the dispersion liquid of Dispersion Liquid "c" (the crosslinkable particles: 53 parts, dispersion medium: methyl ethyle ketone (MEK)), 23.5 parts of dipentaerythritol hexacrylate, 55 parts of cyclohexanone, 0.9 parts of 1-hydroxycyclohexyl phenyl ketone, and 0.9 parts of 2-methyl-1-(4-(methylthio)phenyl)-2-morpholinopropanone-1 were blended by stirring for two hours in a dry air stream in a container shielded from ultraviolet rays at 50, to obtain a composition in the form of a homogeneous solution. The solid content of the composition was determined in the same manner as in Preparation Example 1, to find that the solid content was 40%.

Examples C15–C18

Compositions of Examples C15–C18 were prepared in the same manner as in Example C14 except for using the components shown in Table 7.

Evaluation of Cured Products

To demonstrate the effects of the composition of the present invention, the cured products obtained from the above-mentioned compositions by coating, drying, and exposure to radiation were evaluated. The evaluation methods used were as follows. The results of the evaluation are shown in Table 7.

Wavy Striation Test

The composition was coated onto a PET film so as to produce a dry film with a thickness of 10 μm using a bar coater and the coated surface was exposed to wind for two minutes using a cooling fan (wind velocity: 5 m/second). After drying in a hot oven at 80° C. for 3 minutes, the coating was irradiated with light at a dose of 1 J/cm$^2$ using a conveyer-type mercury lamp to investigate any disorderly conditions in the coating film by eye observation. In the case where there were no foreign matter and abnormalities in the coated film, such as unevenness, cissing, or non-transparency, the sample was rated as ○, otherwise the sample was rated as X.

Streak Test 1 ml of the composition of the present invention was dropped onto a on PET film to make a drop with a 10 cm width. After having been allowed to stand for two minutes at room temperature, the composition was coated using a bar coater so as to produce a dry film with a thickness of 10 μm, dried in a hot oven at 80 for 3 minutes, and irradiated with light at a dose of 1 J/cm$^2$ using a conveyer-type mercury lamp to obtain a cured coating. Disorderly conditions of the coating film were observed by the naked eye. The sample was rated as ○, when there was no streak of the bar coater on the coating film; as Δ when there was a streak of the bar coater with a width 1 cm to 3 cm; and as X when the width of the bar coater streak was more than 3 cm.

TABLE 7

| | Example | | | | | | |
|---|---|---|---|---|---|---|---|
| | C12 | C13 | C14 | C15 | C16 | C17 | C18 |
| Crosslinkable particles (A) | | | | | | | |
| Dispersion Liquid "a" excluding the solvent | 53 | 53 | | | 53 | | |
| Dispersion Liquid "c" excluding the solvent | | | 53 | | | | |
| Dispersion Liquid "g" excluding the solvent | | | | 53 | | | 53 |

TABLE 7-continued

| | Example | | | | | | |
|---|---|---|---|---|---|---|---|
| | C12 | C13 | C14 | C15 | C16 | C17 | C18 |
| Dispersion Liquid "e" excluding the solvent | | | | | | 78 | |
| Acrylic ester | | | | | | | |
| M1 | 23.5 | 23.5 | 23.5 | 23.5 | 13 | 23.5 | 23.5 |
| M2 | 23.5 | 23.5 | 23.5 | 23.5 | 9 | 23.5 | 23.5 |
| Radioactive polymerization initiator | | | | | | | |
| R1 | 0.9 | 0.9 | 0.9 | 0.9 | 1.3 | 0.9 | 0.9 |
| R2 | 0.9 | 0.9 | 0.9 | 0.9 | 1.3 | 0.9 | 0.9 |
| Organic solvent (Relative evaporation rate) | | | | | | | |
| MEK (3.7) | 31 | 31 | 98 | 18 | 143 | 98 | |
| Toluene (2.0) | | | | | | 91 | |
| MIBK (1.6) | 122 | 76 | | | | | |
| Isopropanol (1.5) | | 46 | | 226 | | | 226 |
| Cyclohexanone (0.32) | | | 55 | 62 | | | |
| Total | 254.8 | 254.8 | 254.8 | 407.8 | 336.6 | 199.8 | 327.8 |
| Non-volatile content (%) | 40 | 40 | 40 | 25 | 30 | 51 | 31 |
| Properties of cured products | | | | | | | |
| Pencil hardness | 8H | 8H | 8H | 8H | 8H | 8H | 8H |
| Adhesion (%) | 100 | 100 | 100 | 100 | 100 | 100 | 100 |
| SW scratch resistance | ○ | ○ | ○ | ○ | ○ | ○ | ○ |
| Curling (mm) | 1 | 1 | 3 | 2 | 3 | 2 | 2 |
| Coatability | | | | | | | |
| Wavy striations | ○ | ○ | ○ | ○ | ○ | X | X |
| Streaks | ○ | ○ | ○ | ○ | ○ | Δ | Δ |

M1: Dipentaerythritol hexacrylate
M2: Pentaerythritol tetraacrylate
R1: 1-Hdroxycyclohexyl phenyl ketone
R2: 2-Methyl-1-[4-(methylthio)phenyl]-2-morpholinopropanone-1

M1: Dipentaerythritol hexacrylate
M2: Pentaerythritol tetraacrylate
R1: 1-Hdroxycyclohexyl phenyl ketone
R2: 2-Methyl-1-[4-(methylthio)phenyl]-2-morpholinopropanone-1

The following examples show the unexpected result of applying coatings to norbornene-type resins.

Preparation of Compositions

The following compositions were prepared using dispersion liquids of the crosslinkable particles (A) prepared in the Preparation Examples (Prep. 1, 3, 4 and 5). Weight ratios of the components of the compositions are shown in Table 8. Table 8 also shows the results of evaluation of the compositions.

Example C19

70 parts of the dispersion liquid of crosslinkable particles (A) (Dispersion Liquid "a") prepared in the Preparation Example 1 (solid content: 24.5 parts), 20 parts of dipentaerythritol hexaacrylate, 10 parts of tricyclodecanediyldimethylene diacrylate, 1.5 parts of 1-hydroxycyclohexyl phenyl ketone, and 1.5 parts of 2-methyl-1-[(4-(methylthio)-phenyl)]-2-morpholinopropanone-1 were blended by stirring for 30 minutes in a dry air stream in a container shielded from ultraviolet rays at room temperature, to obtain a composition.

Example C20–C24 and Comparative Example 1–3

Compositions were obtained in the same manner as in Example 1 from the components with proportions shown in Table 8. The dispersion liquid P1 used in the Comparative Example 3 is the above dispersion liquid (methyl ethyl ketone silica sol) of the oxide particles used as a raw material for the crosslinkable particles (A).

irradiated at a dose of 1 J/cm2 using a conveyer-type mercury vapor lamp, and stored at 25° C. for 24 hours before the evaluation.

2. Substrates

TABLE 8

|  | Example | | | | | | Comparative Example | | |
|---|---|---|---|---|---|---|---|---|---|
|  | C19 | C20 | C21 | C22 | C23 | C24 | 1 | 2 | 3 |
| (A) Dispersion liquid | | | | | | | | | |
| a | 70 (24.5)* | | | | 70 (24.5)* | 70 (24.5)* | 70 (24.5)* | 70 (24.5)* | |
| c | | 70 (23.8)* | | | | | | | |
| d | | | 70 (17.5)* | | | | | | |
| e | | | | 70 (17.5)* | | | | | |
| Dispersion liquid | | | | | | | | | |
| P1 | | | | | | | | | 70 (21)* |
| (C) | 10 | 10 | 10 | 10 | 10 | 10 | 1 | 29 | 10 |
| (B) M1 | 20 | 20 | 20 | 20 | 20 | 20 | 29 | 1 | 20 |
| (D) | | | | | | | | | |
| D1 | 1.5 | 1.5 | 1.5 | 1.5 | 3 | | 1.5 | 1.5 | 1.5 |
| D2 | 1.5 | 1.5 | 1.5 | 1.5 | | 3 | 1.5 | 1.5 | 1.5 |
| Total | 103 | 103 | 103 | 103 | 103 | 103 | 103 | 103 | 103 |
| Non-volatile component (%) | 56 | 55 | 49 | 49 | 56 | 56 | 56 | 56 | 52 |
| Substrate | A | Z | A | A | A | A | A | A | A |
| Appearance | ○ | ○ | ○ | ○ | ○ | ○ | ○ | ○ | ○ |
| Transmittance (%) | 95 | 95 | 95 | 95 | 95 | 95 | 95 | 95 | 83 |
| Pencil hardness | 3H | 3H | 3H | 3H | 2H | 2H | 2H | H | B | 2H |
| Adhesion (%) | 100 | 100 | 100 | 100 | 100 | 100 | 0 | 100 | 0 |
| SW Scratch resistance | ○ | ○ | ○ | ○ | ○ | ○ | XX | X | XX |

The parenthesized numbers indicate the contents of solid component.
P1: Methyl ethyl ketone silica sol
C: Tricyclodecanediyldimethylene diacrylate
M1: Dipentaerythritol hexacrylate
D1: 1-Hdroxycyclohexyl phenyl ketone
D2: 2-Methyl-1-[4-(methylthio)phenyl]-2-morpholinopropanone-1
A: Norbornene-type resin (manufactured by JSR Corporation, trade name: ARTON)
Z: Norbornene-type resin (manufactured by Nippon Zeon Co., Ltd., trade name: ZEONEX)

The parenthesized numbers indicate the contents of solid component.
P1: Methyl ethyl ketone silica sol
C: Tricyclodecanediyldimethylene diacrylate
M1: Dipentaerythritol hexacrylate
D1: 1-Hdroxycyclohexyl phenyl ketone
D2: 2-Methyl-1-[4-(methylthio)phenyl]-2-morpholinopropanone-1
A: Norbornene-type resin (manufactured by JSR Corporation, trade name: ARTON)
Z: Norbornene-type resin (manufactured by Nippon Zeon Co., Ltd., trade name: ZEONEX)

Evaluation of Compositions

Cured products were prepared from the compositions prepared in Examples C19–C24 and Comparative Examples 1–3 by coating and drying the compositions, and irradiating the coatings with light to evaluate coating films in terms of appearance, transparency (light transmittance), pencil hardness, adhesion properties, and steel wool (SW) scratch resistance. The results are shown in Table 8.

The evaluation methods used were as follows.

1. Coating, Drying, and Curing Conditions

The compositions prepared in Examples C19–C24 and Comparative Examples 1–3 were applied to substrates using a bar coater so as to produce dry films with a thickness of 10 μm, dried in a hot blast dryer at 80° C. for 3 minutes, Evaluations other than pencil hardness was carried out using films made from a norbornene-type resin ARTON with a thickness of 188 μm.

For the evaluation of the composition prepared in Example 1, a norbornene-type resin ZEONEX was used in addition to the norbornene-type resin ARTON.

3. Evaluation Method

Appearance and Transparency of Coatings

Appearance and transparency of the resulting coating were observed to evaluate the presence or absence of unusual matters and abnormalities such as coating unevenness, repellency, whiteness, etc. The samples in which no such abnormalities were found were rated as ○, otherwise the samples were rated as X.

Steel Wool (SW) Scratch Resistance

Coatings were prepared using the same curing conditions as in the evaluation of coating film appearance. Using the Gakushin-type abrasion tester manufactured by Tester Industry Co., Ltd. #0000 steel wool with a load of 500 g was reciprocated 30 times on the coated surface to evaluate scratches of the coating film surface by naked eye observation. The case where no scratch was found was rated as ○, where there were 1–10 scratches was rated as Δ, and where more than 10 scratches was found was rated as X. Those for which the coatings were peeled off during the test were rated as XX.

What is claimed is:

1. A crosslinkable resin composition consisting essentially of:
   (A) particles (A) prepared by bonding at least one oxide ($A_1$) of an element selected from the group consisting of silicon, aluminum, zirconium, titanium, zinc, germanium, indium, tin, antimony, and cerium, and a specific organic compound ($A_2$) which includes a polymerizable unsaturated group and a group shown by the following formula (1):

wherein X represents NH, O (oxygen atom), or S (sulfur atom), and Y represents O or S,
   (B) a compound which possesses four (4) or more polymerizable unsaturated groups in the molecule,
   (C) a compound which possesses one (1) to three (3) polymerizable unsaturated groups in the molecule,
   (D) optionally, a photoinitiator
   (E) optionally, a solvent or a mixture of solvents.

2. The resin composition according to claim 1 above, wherein the specific organic compound ($A_2$) comprises a group represented by [—O—C(=O)—NH—] and at least one of the groups represented by [—O—C(=S)—NH—] or [—S—C(=O)—NH—].

3. The resin composition according to claim 1, wherein the specific organic compound ($A_2$) is a compound having a silanol group or a compound which forms a silanol group by hydrolysis.

4. The resin composition according to claim 1, wherein the component (B) is a (meth)acrylate compound having four or more (meth)acryloyl groups in the molecule, each (meth)acryloyl group having a molecular weight of 150 or less.

5. The resin composition according to claim 1, wherein the component (C) is a di- or tri-functional (meth)acrylate compound, each (meth)acryloyl group having a molecular weight of 200 or less.

6. The resin composition according to claim 1, comprising 5–90 wt % of the component (A), 5–75 wt % of the component (B), and 5–75 wt % of the component (C) for 100 wt % of the components (A), (B), and (C).

7. The resin composition according to claim 1, wherein said composition comprises said polymerization initiator.

8. The resin composition according to claim 1, wherein particles (A) are present which are prepared by bonding the oxide ($A_1$), the specific organic compound ($A_2$) and a compound ($A_3$), which does not include a polymerizable unsaturated group, but includes a silanol group or a group which forms a silanol group by hydrolysis.

9. The resin composition according to claim 3, wherein the group which forms a silanol group by hydrolysis is an alkoxysilyl group or aryloxysilyl group.

10. The resin composition according to claim 1, wherein said composition comprises at least two organic solvents having a different relative evaporation rate, the difference between the maximum relative evaporation rate and the minimum relative evaporation rate of the solvents being 1.5 or more.

11. The resin composition according to claim 10, wherein the mixed solvent comprises an organic solvent having a relative evaporation rate of 1.5 or less.

12. The resin composition according to claim 10, wherein the amount of the organic solvents in the mixed solvent (C) is 10 wt % or more relative to 100 wt % of the mixed solvent (C).

13. A resin composition according to claim 1 comprising a (meth)acrylic ester having an alicyclic structure, whereby the ratio by weight of the (meth) acrylic ester having an alicyclic structure to compound (B) plus compound (C) is from 5:95 to 90:10.

14. The resin composition according to claim 13, wherein said (meth)acrylic ester is at least one compound selected from the group consisting of (meth)acrylic esters having a bicyclo[2.2.1]heptane ring, (meth)acrylic esters having a tricyclo[5.2.1.0$^{2,2}$]decane ring, and (meth)acrylic esters having a tetracyclo[6.2.1.0$^{2,7}$.1$^{3,6}$]dodecane ring.

15. A resin composition according to claim 1 comprising a polyfunctional urethane compound (b1) having at least two (meth)acryloyl groups, each having a molecular weight of 400 or less, and at least two groups of the formula [—O—C(=O)—NH—] in the molecule, an organofluoro surfactant (b2) or a thermoplastic polymer (b3) with a glass transition temperature of 40° C. or more.

16. Crosslinkable particles (A) prepared by bonding at least one oxide (A1) of an element selected from the group consisting of silicon, aluminum, zirconium, titanium, zinc, germanium, indium, tin, antimony, and cerium, a compound (A2) which includes a polymerizable unsaturated group, a group shown by the following formula (1):

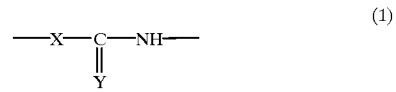

wherein X represents NH, O (oxygen atom), or S (sulfur atom), and Y represents O or S and a silanol group or a group which forms a silanol group by hydrolysis, and a compound (A3) which does not include a polymerizable unsaturated group, but includes a silanol group or a group which forms a silanol group by hydrolysis.

17. A resin composition comprising the crosslinkable particles as defined in claim 16, and a compound which possesses two or more polymerizable unsaturated groups in the molecule.

18. A crosslinkable resin composition comprising:
   (A) particles (A) prepared by bonding at least one oxide (A1) of an element selected from the group consisting of silicon, aluminum, zirconium, titanium, zinc, germanium, indium, tin, antimony, and cerium, and a specific organic compound ($A_2$) which includes a polymerizable unsaturated group and a group shown by the following formula (1):

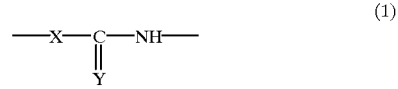

wherein X represents NH, O (oxygen atom), or S (sulfur atom), and Y represents O or S,
   (B) a compound which possesses two (2) or more polymerizable unsaturated groups in the molecule, and
   (C) a mixed solvent (E), comprising at least two organic solvents having a different relative evaporation rate, the difference between the maximum relative evaporation rate and the minimum relative evaporation rate of the solvents being 1.5 or more.

19. A crosslinkable resin composition comprising:
(A) particles (A) prepared by bonding at least one oxide ($A_1$) of an element selected from the group consisting of silicon, aluminum, zirconium, titanium, zinc, germanium, indium, tin, antimony, and cerium, and a specific organic compound ($A_2$) which includes a polymerizable unsaturated group and a group shown by the following formula (1):

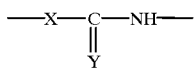
(1)

wherein X represents NH, O (oxygen atom), or S (sulfur atom), and Y represents O or S,
(B) a compound which possesses two (2) or more polymerizable unsaturated groups in the molecule, and
(C) a (meth)acrylic ester having an alicyclic structure, said (meth)acrylic ester being selected from the group consisting of dicyclopentanyl (meth)acrylate, tricyclodecanediyl di(meth)acrylate, and tetratricyclodecanediyl di(meth)acrylate, whereby the ratio by weight of the (meth) acrylic ester having an alicyclic structure to compound (B) is from 5:95 to 90:10.

20. A process for preparing the crosslinkable particles A as defined in claim 16, wherein the oxide particles ($A_1$), the compound ($A_2$), and the compound ($A_3$) are bonded by treating the oxide particles ($A_1$) with the compound ($A_2$) and then treating the resulting product with the compound ($A_3$).

21. A composite material prepared by coating the resin composition of claim 13 on the surface of an article made from a resin which comprises a (co)polymer having an alicyclic structure as a major component, and curing the coating.

22. A cured product produced by curing the resin composition according to claim 1.

23. A composite material prepared by coating the resin composition of claim 19 on the surface of an article made from a resin which comprises a (co)polymer having an alicyclic structure as a major component, and curing the coating.

24. A cured product produced by curing the resin composition according to claim 18.

* * * * *